(12) United States Patent
Chu et al.

(10) Patent No.: US 7,720,976 B2
(45) Date of Patent: May 18, 2010

(54) PEER-TO-PEER COMMUNICATION BETWEEN DIFFERENT TYPES OF INTERNET HOSTS

(75) Inventors: Thomas P. Chu, Englishtown, NJ (US); Frank Feather, Englishtown, NJ (US); Yung-Terng Wang, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 219 days.

(21) Appl. No.: 12/059,105

(22) Filed: Mar. 31, 2008

(65) Prior Publication Data

US 2009/0248800 A1    Oct. 1, 2009

(51) Int. Cl.
*G06F 15/16* (2006.01)
*H04J 3/22* (2006.01)

(52) U.S. Cl. .................. 709/227; 709/235; 709/245; 370/466

(58) Field of Classification Search .......... 709/227, 709/235, 245; 370/466
See application file for complete search history.

(56) References Cited

U.S. PATENT DOCUMENTS 7,231,452 B2 *  6/2007  Ananda et al. ............ 709/230

7,411,967 B2 *  8/2008  Thubert et al. ............ 370/401
2005/0243840 A1 * 11/2005  Sivalingam et al. ......... 370/401

OTHER PUBLICATIONS

"Dual Stack IPv6 Dominant Transition Mechanism (DSTM)," J. Bound, et al., www.ipv6.rennes.enst-bretagne.fr, 2005, [Retrieved on Feb. 15, 2008] Retrieved from the Internet: <URL: http://www.ipv6.rennes.enst-bretagne.fr/dstm/doc/draft-bound-dstm-exp-04.txt> (15 pages).

(Continued)

*Primary Examiner*—Quang N. Nguyen
*Assistant Examiner*—Nam Thai
(74) *Attorney, Agent, or Firm*—Mendelsohn, Drucker & Associates, P.C.; Edward J. Meisarosh; Steve Mendelsohn

(57) ABSTRACT

In one embodiment, a method for processing, at an enhanced Session Initiation Protocol (SIP) proxy (e-proxy), (1) a SIP INVITE message to a first user at an IPv4/IPv6 dual-stack (DS) host, connected to an IPv6 network, from a second user at an IPv4 host, connected to an IPv4 network. The e-proxy receives the SIP INVITE message from the IPv4 network. When the e-proxy determines that Dual Stack Transition Mechanism (DSTM) service is required, the e-proxy obtains a temporary IPv4 address for the DS host, finds a suitable tunnel end-point (TEP), and sends a corresponding, but modified, INVITE message to the DS host. The modified INVITE message body includes invocation of DSTM service, the temporary IPv4 address, the TEP's IPv6 address, and the IPv4 host's IPv4 address. The e-proxy sends a BIND message to the TEP to bind the DS host's IPv6 address to the temporary IPv4 address for proper tunneling.

21 Claims, 13 Drawing Sheets

OTHER PUBLICATIONS

"An IPv4-to-IPv6 Dual Stack Transition Mechanism Supporting Transparent Connections between IPv6 Hosts and IPv4 Hosts in Integrated IPv6/IPv4 Network," by Eun-Young Park, et al., 2004 IEEE International Conference on Communications, vol. 2, Jun. 2004, pp. 1024-1027.

"SDP: Session Description Protocol," M. Handley, et al., IETF RFC 2327, 1998, [retrieved on Feb. 12, 2008] Retrieved from the Internet: <URL: http://www.ietf.org/rfc/rfc2327.txt> (43 pages).

"Megaco Protocol Version 1.0," F. Cuervo, et al., IETF RFC 3015, 2000, [retrieved on Feb. 25, 2008] Retrieved from the Internet: <URL: http://tools.ietf.org/rfc/rfc3015.txt> (180 pages).

"SIP: Session Initiation Protocol," J. Rosenberg, et al., IETF RFC 3261, 2002, [retrieved on Feb. 11, 2008] Retrieved from the Internet: <URL: http://www.ietf.org/rfc/rfc3261.txt> (270 pages).

"Diameter Base Protocol," P. Calhoun, et al., IETF RFC 3588, 2003, [retrieved on Feb. 25, 2008] Retrieved from the Internet: <URL: http://tools.ietf.org/rfc/rfc3588.txt> (148 pages).

"Basic Transition Mechanisms for IPv6 Hosts and Routers," E. Nordmark, et al., 2005, IETF RFC 4213 [retrieved on Oct. 29, 2007] Retrieved from the Internet: <URL: http://tools.ietf.org/html/rfc4213> (28 pages).

* cited by examiner

601 E-PROXY — marketing.location1.companyABC.com
602 DS HOST — sip:user1@marketing.location1.companyABC.com, IPv6 ADDRESS = A
603 IPv4 HOST — sip:user2@sales.location2.companyABC.com, IPv4 ADDRESS = B
604 TEP — IPv6 ADDRESS = C
605 LOCAL IPv6 NETWORK
606 IPv4 CORE NETWORK
607 SIP PROXY — sales.location2.companyABC.com
608 LOCAL IPv4 NETWORK
609 OTHER IPv6 HOSTS
610 OTHER IPv4 HOSTS
611 OTHER LOCAL IPv4 NETWORKS
612 OTHER LOCAL IPv6 NETWORKS
613 TEPs

600

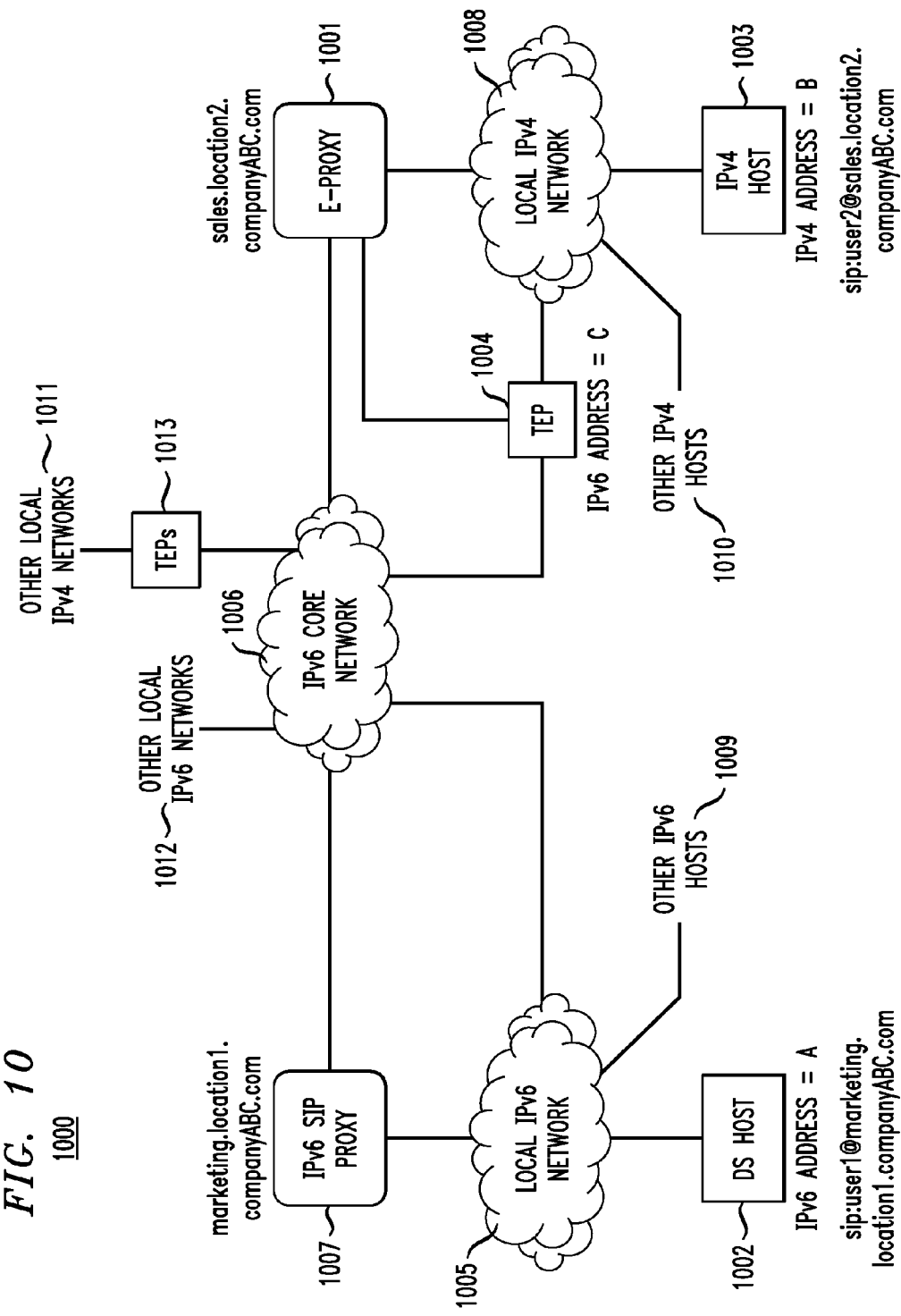

- IPv6 SIP PROXY — 1007, marketing.location1.companyABC.com
- E-PROXY — 1001, sales.location2.companyABC.com
- IPv6 CORE NETWORK — 1006
- TEP — 1004, IPv6 ADDRESS = C, TEMPORARY IPv4 ADDRESS = D
  - 1001an, 1004an
- LOCAL IPv4 NETWORK — 1008
  - 1001cn
- IPv4 HOST — 1003, IPv4 ADDRESS = B, sip:user2@sales.location2.companyABC.com
  - 1003an
- 1007bn, 1001bn
- LOCAL IPv6 NETWORK — 1005
  - 1007an, 1002an
- DS HOST — 1002, IPv6 ADDRESS = A, TEMPORARY IPv4 ADDRESS = D, sip:user1@marketing.location1.companyABC.com

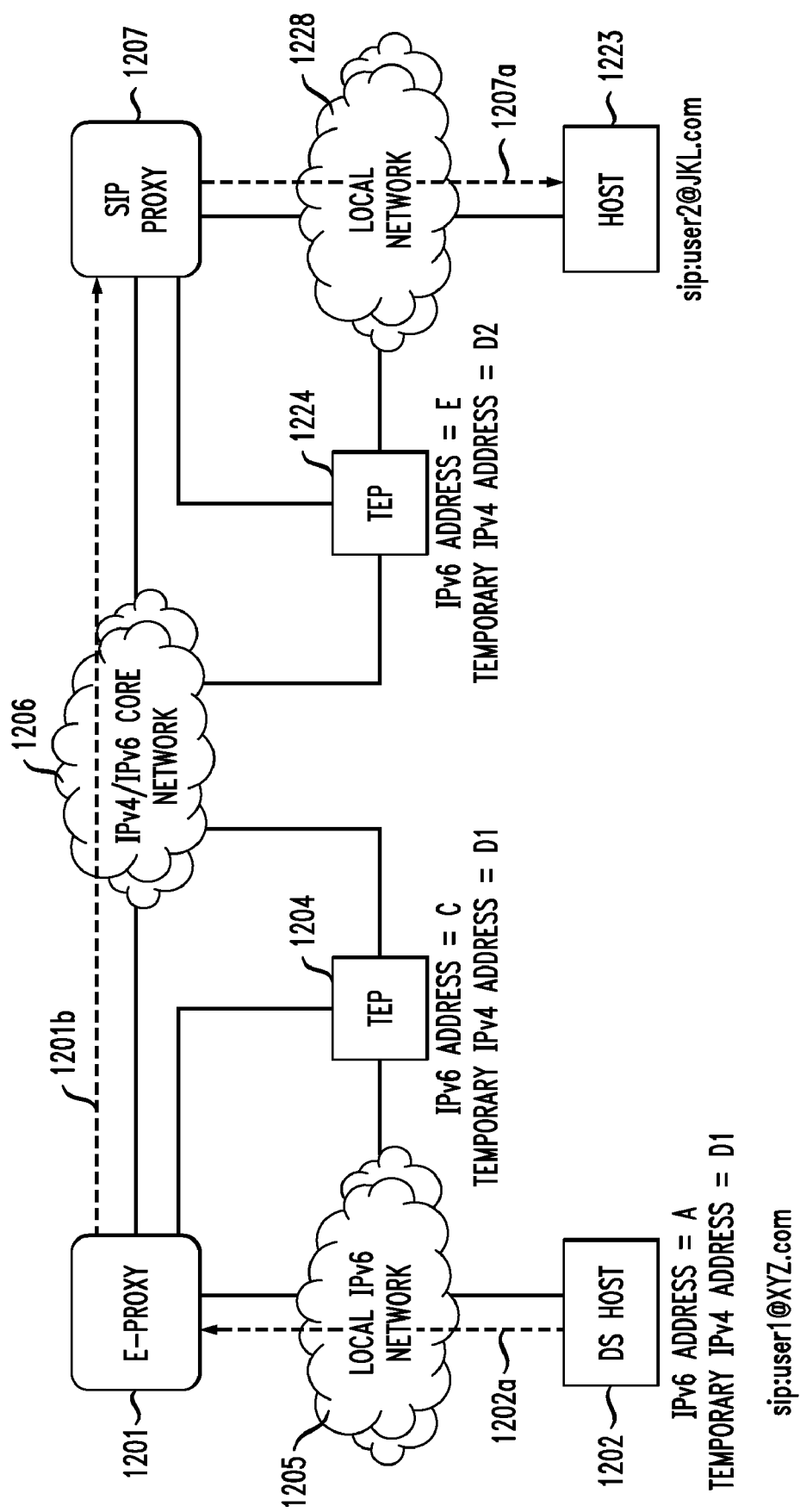

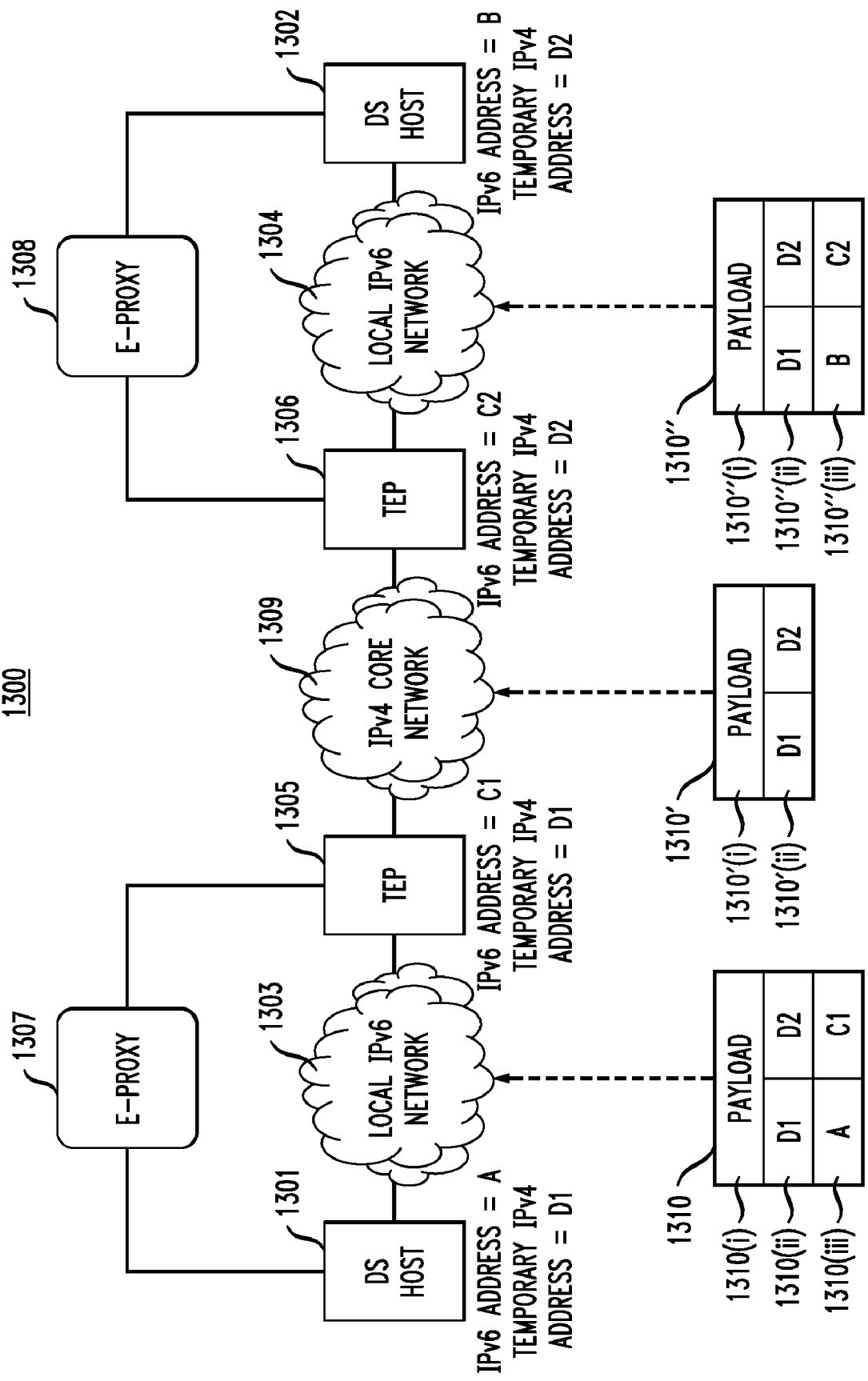

PEER-TO-PEER COMMUNICATION BETWEEN DIFFERENT TYPES OF INTERNET HOSTS

BACKGROUND OF THE INVENTION

1. Field of the Invention

The current invention relates to peer-to-peer communication between different types of Internet hosts, and, in particular, to peer-to-peer call signaling between different types of Internet hosts.

2. Description of the Related Art

The Internet is a network of networks that provides access to innumerable instances of many types of information. One segment of the Internet is the world-wide web (www or the Web), which is a collection of interlinked hypertext documents and services accessible via uniform resource locator (URL) addresses. The Web operates in a client-server mode, where a client retrieves information from a server. Another model for Internet communication is peer-to-peer (P2P) communication, where two computers communicate as peers with each other. Examples of P2P applications include file-sharing programs and Internet telephony applications such as voice-over-Internet protocol (VoIP) and multimedia conferencing applications.

SIP

In a typical peer-to-peer application, the logical connectivity between the two peers is dynamic in nature, where connections are set up when needed to establish a session and torn down when the session is finished. In the Internet environment, one widely accepted call-signaling protocol for logical connectivity between peer hosts is the Session Initiation Protocol (SIP), described in RFC 3261, titled "SIP: Session Initiation Protocol," incorporated herein by reference in its entirety (available online at http://www.ietf.org/rfc/rfc3261.txt). SIP provides extensive capabilities as well as flexibility in call signaling.

FIG. 1 shows a sample data flow diagram for a basic call setup between SIP host 101 and SIP host 102. Message flow in FIG. 1 proceeds from top to bottom. Hosts 101 and 102 are each running User Agents (UAs). Host 101 hosts a first user, user1, of company A, identified by SIP universal resource identifier (SIP URI) sip:user1@companyA.com, while host 102 hosts a second user, user2, of company B, identified by SIP URI sip:user2@companyB.com. The "sip:" prefixes are used to identify the URIs as SIP URIs. The "sip:" prefix may be omitted in some circumstances, such as when the context clearly indicates that the URI is a SIP URI.

Host 101's UA initiates a call to host 102 by sending INVITE message 101a to host 102's UA. Host 102 might respond with one or more provisional response messages (also known as "1xx" messages) (not shown), which contain status information and indicate that request processing is in progress. If host 102 accepts the call request, then host 102 transmits OK message 102a (an OK messages is also known as a "200" message). Host 101 then responds with ACK (acknowledgment) message 101b, which completes the call set-up transaction. This establishes application-layer connectivity 101c between host 101 and host 102 allowing transmission of data in accordance with the parameters established between hosts 101 and 102 through the above-described exchange of messages.

The parameters of the application-layer connection are encoded in the previously described SIP messages. The parameters may be encoded in the format specified by the Session Description Protocol (SDP), described in RFC 2327 and incorporated herein by reference in its entirety (available online at http://www.ietf.org/rfc/rfc2327.txt). Examples of encoded parameter information include the IP address and UDP (user datagram protocol) port number to be used by the application traffic, called bearer traffic. SIP messages can also include information in addition to that provided by standard SIP headers and SDP. When host 101 wishes to terminate the call, host 101 transmits BYE message 101d to host 102, which initiates session tear-down. Host 102 then responds with OK message 102b, and the session is terminated.

SIP is a flexible protocol which allows many extensions to accommodate different situations. For example, SIP body messages may be encoded in accordance with the Multipurpose Internet Mail Extension (MIME) standard. SIP message bodies may contain multiple sections, where, using a "handling" parameter, some sections may be defined as required and other sections may be defined as optional. If a SIP proxy receives a SIP message with an optional section that the SIP proxy does not understand, then the SIP proxy ignores that optional section and processes the SIP message as if it did not contain that optional section. However, if a SIP proxy receives a SIP message with a required section that the SIP proxy does not understand, then the SIP proxy should reject the message and respond with a suitable error code.

SIP Proxies

FIG. 2 shows an example of using SIP routing to set up a call in network 200, which comprises hosts 201 and 206. Hosts 201 and 206 (1) are in different locations, (2) are not directly connected, and (3) are separated by various intermediaries. The intermediaries include SIP proxy servers (proxies) 202, 203, 204, and 205. SIP proxies are logical entities whose functions include (1) forwarding SIP messages towards their proper destinations and (2) providing enhanced services to SIP calls when appropriate.

Host 201 hosts a first user whose SIP URI is sip:user1@marketing.location1.companyABC.com and who is in the marketing department at location 1 of ABC company. The first user wants to establish a session with a second user whose SIP URI is sip:user2@sales.location2.companyABC.com, who is in the sales department at location 2, also of ABC company, and who is hosted by host 206. As part of the user login process, the user's host registers with a corresponding home SIP proxy, where the host sends a REGISTER message to the corresponding home SIP proxy, and the home SIP proxy indicates acceptance of the registration by replying with an OK message. Thus, (i) host 201 sends a REGISTER message to SIP proxy 202, whose SIP URI is marketing.location1.companyABC.com, (ii) SIP proxy 202 responds with an OK message to host 201, (iii) host 206 sends a REGISTER message to SIP proxy 205, whose SIP URI is sales.location2.companyABC.com, and (iv) SIP proxy 205 responds with an OK message to host 206. These REGISTER and OK messages are not shown in FIG. 2.

When the first user indicates a desire to call the second user, host 201 generates and sends INVITE message 201a, for the second user, to home SIP proxy 202 via IP network cloud 207. INVITE message 201a indicates that it is from user1@marketing.location1.companyABC.com and intended for, i.e., addressed to, user2@sales.location2.companyABC.com. Based on the addressee, SIP proxy 202 determines that INVITE message 201a is for a recipient at another location, and sends corresponding INVITE message 202a via IP network cloud 208 to affiliated gateway SIP proxy 203, whose SIP URI is gateway.location1.companyABC.com. INVITE message 202*a* is substantially identical to INVITE message 201*a*, but is modified to indicate its passage via SIP proxy 202 using the "via" header section that is in INVITE messages for delineating their passage through a network.

Based on the addressee in INVITE message 202*a*, gateway SIP proxy 203 determines that INVITE message 202*a* is for a recipient at location 2, and sends corresponding INVITE message 203*a* via IP network cloud 209 to location 2 gateway SIP proxy 204, whose SIP URI is gateway.location2.companyABC.com. INVITE message 203*a* is substantially identical to INVITE message 202*a*, but is modified to indicate passage via SIP proxy 203. Based on the addressee in INVITE message 203*a*, location 2 gateway SIP proxy 204 determines that INVITE message 203*a* is for a recipient in the sales department at location 2, and sends corresponding INVITE message 204*a* via IP network cloud 210 to location 2 sales SIP proxy 205, whose SIP URI is sales.location2.companyABC.com. SIP proxy 205 is the home SIP proxy for the second user at host 206. INVITE message 204*a* is substantially identical to INVITE message 203*a*, but is modified to indicate passage via SIP proxy 204.

Based on the addressee in INVITE message 204*a*, SIP proxy 205 determines that INVITE message 204*a* is for a user at host 206, and sends corresponding INVITE message 205*a* via IP network cloud 211 to host 206, where the second user is registered. INVITE message 205*a* is substantially identical to INVITE message 204*a*, but is modified to indicate passage via SIP proxy 205. If the second user indicates acceptance of the invitation, then host 206 responds with OK message 206*a* addressed to the first user. Since INVITE message 205*a* listed the SIP proxies traversed to arrive at host 206, OK message 206*a* can specify, in a "via" header section, the reverse route as the path for OK message 206*a*.

As OK message 206*a* traverses the reverse route, traversed SIP proxies are removed from the "via" header section. OK message 206*a* goes first to SIP proxy 205 via IP network 211, next, it is forwarded as substantially identical OK message 205*b* to SIP proxy 204 via IP network 210. Then, the OK message is forwarded as substantially identical OK message 204*b* to SIP proxy 203 via IP network 209, then it is forwarded as substantially identical OK message 203*b* to SIP proxy 202 via IP network 208. Finally, the OK message is forwarded as substantially identical OK message 202*b* to host 201, where the first user is registered. Host 201 would then reply with an acknowledgement ACK message (not shown) which would follow the same SIP proxy route as the INVITE message and would complete the call set-up procedure.

It should be noted that IP network clouds 207, 208, 209, 210, and 211 can comprise zero or more network components such as hubs, switches, bridges, and routers. Furthermore, IP network clouds 207, 208, 209, 210, and 211 might share one or more network components among themselves and may all be interconnected. As noted, as SIP messages transit through proxies, each proxy can modify the SIP message. The SIP specification describes the extent of allowable modifications. To support some advanced features, a SIP proxy may modify SIP messages beyond the extent allowed in the specification. One example of such an advanced feature is back-to-back user agent (B2BUA) mode, where the SIP proxy acts as an endpoint of the incoming SIP call from the originator, and generates a new SIP call towards the destination. The SIP proxy then keeps track of both calls and coordinates them.

IPv6

Currently, the commonly used version of the Internet Protocol (IP) is IP version 4 (IPv4). In the early 1990s, the Internet Engineering Task Force (IETF) estimated that the IPv4 address space was nearing exhaustion. Based on this, the IETF initiated work on the next generation of IP to solve this address-shortage problem. The result was IP version 6 (IPv6). IPv6 has a much larger address space than IPv4 because IPv6 uses 128-bit addresses as opposed to IPv4's 32-bit addresses. In addition to the larger address space, IPv6 has other enhanced features, such as a better-structured address space, better multicast support, better mobility support, neighbor discovery, support for authentication and payload encryption, and quality of service (QoS) support. IPv6 may be said to represent a different address family from IPv4.

During the development of IPv6, the IETF chartered a working group (WG) to investigate techniques to prolong the useful life of IPv4. A number of techniques were developed and are being used today, such as Classless Inter-domain Routing (CIDR), Dynamic Host Configuration Protocol (DHCP), Allocation for private address (as described in RFC 1918), Network Address Translation (NAT), and various tunneling technologies such as Multi-Protocol Label Switching (MPLS) and Generic Routing Encapsulation (GRE).

Although these techniques are in wide use today, there is consensus in the industry that IPv4 is near the end of its life cycle and that deployment of IPv6 will become common soon. Several reasons, outlined below, account for this. First, much of the existing IPv4 address space has been assigned to U.S.-based organizations. Meanwhile, other countries will be deploying more IP systems, and countries with large populations would likely install IPv6 systems. Second, while, in the early 1990s, IP hosts mostly comprised PCs and servers, today, many other devices, such as cell phones, automobiles, TV set-top boxes, and domestic appliances, are using IP for communication. This requires many more IP addresses. Third, the various IPv4 address-preservation techniques have shortcomings. For example, using NAT with many applications requires the use of an application-specific application layer gateway (ALG) in order to appropriately perform port address translations. The use of ALGs in NAT increases complexity and cost and degrades performance. Other techniques have similar limitations. Therefore, many organizations, service providers, and enterprises are investigating methods and systems for transitioning from IPv4 to IPv6.

IPv4 to IPv6 Transition

A sizeable network cannot transition from IPv4 to IPv6 in an instant. The transition process is likely to take months or even years as IPv4 systems are replaced with IPv6 systems. Therefore, the two versions will coexist for some time in a network. The IETF has developed a number of techniques to enable interoperability between IPv4 and IPv6 hosts to ease the transition. Each technique addresses a specific interoperability configuration. Examples of these techniques include 6over4 (described in RFC 3056), Intra-Site Automatic Tunnel Addressing Protocol (ISATAP; described in RFC 4214), Teredo (described in RFC 4380), and Dual Stack Transition Mechanism (DSTM). A network may use any number of these techniques during a transition from IPv4 to IPv6.

DSTM

DSTM (dual stack transition mechanism) is a protocol interworking mechanism and is described in (1) the IETF draft titled "Dual Stack IPv6 Dominant Transition Mechanism (DSTM)," by Jim Bound et al., October 2005, (available online at http://www.ipv6.rennes.enst-bretagne.fr/dstm/doc/draft-bound-dstm-exp-04.txt) and (2) the 2004 IEEE International Conference on Communications article titled "An IPv4-to-IPv6 dual stack transition mechanism supporting transparent connections between IPv6 hosts and IPv4 hosts in integrated IPv6/IPv4 network," by Eun-Young Park et al., June 2004 (available online from ieeexplore.ieee.org), both incorporated herein by reference in their entireties.

FIG. 3 shows sample hybrid network 300, which comprises IPv6 network 305 and IPv4 network 306. Network 300 uses DSTM to allow communication between DSTM-enabled host (or end-point) 301 and IPv4 host (or end-point) 302. DSTM host 301, which is capable of handling both IPv4 and IPv6 communication, is connected to IPv6 network 305 and has IPv6 address A. IPv4 host 302, which is capable of handling IPv4—but not IPv6—communication, is connected to IPv4 network 306 and has IPv4 address B. Network 300 further comprises (i) tunnel end-point (TEP) 303, which has IPv6 address C and connects IPv6 network 305 and IPv4 network 306, and (ii) DSTM address server 304, which is connected to IPv6 network 305.

DSTM host 301 can have a permanent IPv4 assigned to it in addition to IPv6 address A, but since that may be an inefficient use of the limited address space available with IPv4, DSTM host 301 instead uses a temporary IPv4 address obtained from DSTM address server 304 when necessary. If DSTM host 301 determines that it needs to send data packet payload 301b(ii) to IPv4 host 302, then DSTM host 301 sends IPv4 address request 301a to DSTM address server 304. DSTM address server 304 responds with IPv4 address assignment 304a which includes temporary IPv4 address D as well as IPv6 address C for corresponding TEP 303. Alternatively, DSTM host 301 may already possess address C for TEP module 303 prior to the receipt of address assignment 304a, which, therefore, need not include address C.

DSTM host 301 encapsulates payload 301b(ii) with IPv4 header 301b(iii) having source address D and destination address B. Payload 301b(ii) is further encapsulated with IPv6 header 301b(iv) having source address A and destination address C. Packet 301b(i), comprising payload 301b(ii) and headers 301b(iii) and 301b(iv), is then sent to TEP 303 as message 301b via IPv6 network 305. This essentially sets up an IPv4-over-IPv6 tunnel between DSTM host 301 and TEP 303. TEP 303 processes message 301b and, as a result, (1) updates its forwarding table to bind temporary IPv4 address D with IPv6 address A using automatic tunnel binding, (2) removes IPv6 packet header 301b(iv) from packet 301b(i) and (3) forwards corresponding packet 303a(i) to IPv4 host 302 as message 303a via IPv4 network 306. Packet 303a(i) comprises (1) payload 303a(ii), which is substantially identical to payload 301b(ii), and (2) IPv4 header 303a(iii), which is substantially identical to IPv4 header 301b(iii). Additional packets from DSTM host 301 to IPv4 host 302 will follow the same path and procedure.

Packets from IPv4 host 302 back to DSTM host 301 also go through TEP 303 and are processed in a mirrored way (not shown). A payload packet from IPv4 host 302 to DSTM host 301 is encapsulated with an IPv4 header having source address B and destination address D and is delivered to TEP 303 via IPv4 network 306. TEP 303 adds an IPv6 header having source address C and destination address A and delivers the packet to DSTM host 301 via IPv6 network 305. DSTM host 301 then extracts the payload from the received packet. If there is a prolonged period of inactivity between DSTM host 301 and IPv4 hosts connected to IPv4 network 306, such as IPv4 host 302, then TEP 303 purges the address binding of IPv6 address A and temporary IPv4 address D. An alternative to using automatic tunnel binding and tear-down at TEP 303 is having DSTM host 301 use a tunneling signaling protocol to explicitly establish and tear down an IPv4-over-IPv6 tunnel to TEP 303.

DSTM is still an IETF draft, has not yet reached RFC status, and is still subject to changes. DHCP is suggested as the protocol for address request and assignment messages. DSTM has several limitations, outlined below, some of which are particularly relevant for applications that use higher-layer call-signaling protocols such as SIP. The DSTM draft does not provide a mechanism for IPv4 host 302 to initiate communication with DSTM host 301. The steps of obtaining an IPv4 address and setting up the IPv4-over-IPv6 tunnel to TEP 303 adds significant call set-up delay, which may be unacceptable for some critical communication applications. Some applications require the use of a tunneling signaling protocol, rather than automatic tunnel binding, and use of the former adds delay.

Connection Initiation by IPv4 Host

Although, as noted above, the DSTM draft does not specify a procedure to allow an IPv4 host to initiate a connection with an DSTM host, some proposals have been made to address this situation. One proposal is illustrated in FIG. 4.

FIG. 4 shows sample hybrid network 400, comprising DSTM host 401, IPv4 host 402, TEP 403, DSTM address server 404, IPv6 network 405, and IPv4 network 406. These elements of FIG. 4 are similar to corresponding elements of FIG. 3 and are similarly numbered, but with a different prefix. FIG. 4 shows various messages that are also sequentially labeled as steps. DSTM host 401 hosts a first user whose URI is sip:user1@marketing.location1.companyABC.com. Network 400 further comprises IPv4 domain name server (DNS) 407, DNS application-layer gateway (ALG) 408, and IPv6 DNS 409.

If IPv4 host 402 wants to send a data packet to the first user, then IPv4 host 402 first sends DNS query 402a (step 1) to IPv4 DNS 407 in order to get an IPv4 address for sip:user1@marketing.location1.companyABC.com. IPv4 DNS 407 does not find sip:user1@marketing.location1.companyABC.com in its database since that URI is associated with an IPv6 address, and so IPv4 DNS 407 forwards the DNS query as query 407a (step 2) to DNS ALG 408. DNS ALG 408, which is IPv6-capable and aware that query 407a came from an IPv4 DNS, sends corresponding DNS query 408a (step 3) to IPv6 DNS 409 requesting either an IPv4 or IPv6 address for the first user's URI. IPv6 DNS 409 gets the first user's IPv6 address and sends it in message 409a (step 4) to DNS ALG 408.

DNS ALG 408 determines that DSTM service is needed because query 407a was for an IPv4 address but response 409a contained an IPv6 address. DNS ALG 408 sends address request 408b (step 5) to DSTM address server 404 on behalf of the first user. DSTM server 404 then allocates one of the IPv4 addresses in its address pool to the first user and sends to DSTM host 401 address allocation message 404b (step 6), which contains the IPv4 address allocated and the IPv6 address of corresponding TEP 403. DSTM host 401 responds with acknowledgement 401c (step 7) to DSTM address server 404. DSTM address server 404 registers the allocated IPv4 address at IPv6 DNS 409 on behalf of the first user with registration message 404c (step 8).

DSTM address server 404 informs DNS ALG 408 of the allocated IPv4 address assigned to the first user with message 404d (step 9). DNS ALG 408 then responds to query 407a with message 408c (step 10), providing the allocated IPv4 address to IPv4 DNS 407, which in turn forwards corresponding message 407b (step 11) to IPv4 host 402. DSTM address server 404 instructs TEP 403 to bind the IPv6 address of the first user and the allocated IPv4 address of the first user using instruction message 404e (step 12). TEP 403 then responds to instruction message 404e with acknowledgment message 403b (step 13). IPv4 host 402 can then communicate with DSTM host 401 via TEP 403 in a manner similar to that described for hybrid network 300 of FIG. 3.

This procedure to allow IPv4 host 402 to initiate communication requires many steps and transactions which cause significant delay in the initial start up. In addition to this performance issue, the procedure has practical limitations. For example, when IPv4 DNS server 407 fails to locate the first user, it is supposed to immediately forward query 407a to DNS ALG 408. In practice, IPv4 DNS 407 comprises a hierarchy of servers. The servers in the hierarchy will try to exhaustively search for the first user's URI in the IPv4 space before forwarding the request to DNS ALG 408, which increases delay. Also, in practice, DNS ALG 408 will be one of several available DNS ALGs. Thus, either complex policy needs to be loaded to IPv4 DNS 407 so that appropriate DNS ALG 408 can be identified or exhaustive searching of the several available DNS ALGs may be required, increasing delay. Furthermore, the general need to locate appropriate servers and communicate among them increases delay.

The current DSTM mechanism of FIG. 3 is, therefore, essentially only suitable for applications that are based on the client-server model (e.g., web browsing) where some initial delay is acceptable. Furthermore, the current DSTM mechanism does not provide support for call setup invitation from an IPv4 host to a DSTM host, and the above-described proposal of FIG. 4 for such invitation is cumbersome. Additionally, neither the current DSTM mechanism nor the above-described proposal support host mobility.

SUMMARY OF THE INVENTION

One embodiment of the invention can be a method for processing signaling protocol (SP) messages. The method comprises receiving an SP invite message addressed to one of: (i) a first user hosted at a first host connected to a first network using a first network addressing protocol (FNAP), the SP invite message addressed from a second user hosted at a second host connected to a second network, different from the first network, using a second network addressing protocol (SNAP), different from the FNAP, and (ii) the second user, the SP invite message addressed from the first user. The first host has an FNAP address. The second host has an SNAP address. The SP invite message invites the addressed-to user to set up a communication session with the addressed-from user. The communication session comprises transmission of bearer traffic packets.

The method further comprises determining that a protocol interworking mechanism for the communication session needs to be invoked, and if a temporary SNAP address is not already associated with the first host's FNAP address, then (i) obtaining a temporary SNAP address to associate with a cross-border transport module (CBTM), wherein the CBTM has an FNAP address and is adapted to convert bearer traffic packets of the communication session between FNAP-compatible format and SNAP-compatible format, and (ii) instructing the CBTM to associate the temporary SNAP address with the first host's FNAP address. The method further comprises forwarding to the addressed-to host a corresponding modified SP invite message that provides at least one of the FNAP address of the CBTM and the temporary SNAP address.

Another embodiment of the invention can be an enhanced signaling protocol (SP) proxy adapted to receive an SP invite message addressed to one of: (i) a first user hosted at a first host connected to a first network using a first network addressing protocol (FNAP), the SP invite message addressed from a second user hosted at a second host connected to a second network, different from the first network, using a second network addressing protocol (SNAP), different from the FNAP, and (ii) the second user, the SP invite message addressed from the first user. The first host has an FNAP address. The second host has an SNAP address. The SP invite message invites the addressed-to user to set up a communication session with the addressed-from user. The communication session comprises transmission of bearer traffic packets.

The enhanced SP proxy is further adapted to determine that a protocol interworking mechanism for the communication session needs to be invoked, and if a temporary SNAP address is not already associated with the first host's FNAP address, then: (i) obtain a temporary SNAP address to associate with a cross-border transport module (CBTM), wherein the CBTM has an FNAP address and is adapted to convert bearer traffic packets of the communication session between FNAP-compatible format and SNAP-compatible format, and (ii) instruct the CBTM to associate the temporary SNAP address with the first host's FNAP address. The enhanced SP proxy is further adapted to forward to the addressed-to host a corresponding modified SP invite message that provides at least one of the FNAP address of the CBTM and the temporary SNAP address.

Yet another embodiment of the invention can be a first host connected to a first network using a first network addressing protocol (FNAP), the first host adapted to receive from an e-proxy a modified SP invite message. The modified SP invite message is generated by the e-proxy from a corresponding first SP invite message addressed to a first user hosted at the first host. The first SP invite message is addressed from a second user hosted at a second host connected to a second network, different from the first network. The second network uses a second network addressing protocol (SNAP), different from the FNAP. Each of the first SP invite message and the corresponding modified SP message has an invitation for the first user to set up a communication session with the second user. The communication session comprises transmission of bearer traffic packets.

The first host has an FNAP address. The second host has an SNAP address. The modified SP invite message provides an FNAP address of a cross-border transport module (CBTM) and a temporary SNAP address associated with the first host's FNAP address. The CBTM is adapted to convert bearer traffic packets of the communication session between FNAP-compatible format and SNAP-compatible format. The first host is further adapted to (a) use a protocol interworking mechanism for the communication session in response to an invocation by the e-proxy, in the modified SP invite message, to use the protocol interworking mechanism and (b) use the FNAP address of the CBTM and the temporary SNAP address in generating outgoing bearer traffic packets for the communication session.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 6 shows a hybrid network that includes an e-proxy for facilitating communication between a local IPv6 network and a local IPv4 network.

FIG. 10 shows a network substantially similar to network 600 of FIG. 6, but where the core network is an IPv6 network.

FIG. 11 shows a portion of network 1000 of FIG. 10, and illustrates basic signaling call flow for the four scenarios when the first user at DS host 1002 initiates or terminates a call to the second user at IPv4 host 1003, and vice versa.

FIG. 12. shows a network that includes a core network that supports both IPv4 and IPv6 communication.

FIG. 13 shows a sample network connecting DS hosts via an IPv4 core network, illustrating the transmission of simplified sample bearer traffic.

DETAILED DESCRIPTION

One embodiment of the invention is an Enhanced SIP proxy (e-proxy), which allows for call setups between IPv4-only hosts connected to an IPv4 network and IPv6/IPv4 dual-stack (DS) hosts connected to an IPv6 network, where the call setup involves generating minimal transactions and, thus, minimal delay. It should be noted that, unless otherwise indicated, the term "IPv4 host" refers to an IPv4-only host, i.e., a host adapted to communicate in accordance with IPv4 but not IPv6. The e-proxy in this embodiment is adapted to interface with and control a corresponding TEP connected between the IPv4 network and the IPv6 network. The e-proxy can provide SIP proxy functionality to both IPv4 hosts and IPv6 hosts, which is useful for the migration of core networks from IPv4 to IPv6. A core network comprises a collection of high-capacity and high-speed routers and links to which local, or access, networks are attached. Access networks are localized networks that provide connectivity to end users. Any two access networks typically communicate with each other via a core network rather than through direct links between them.

Figure 1:
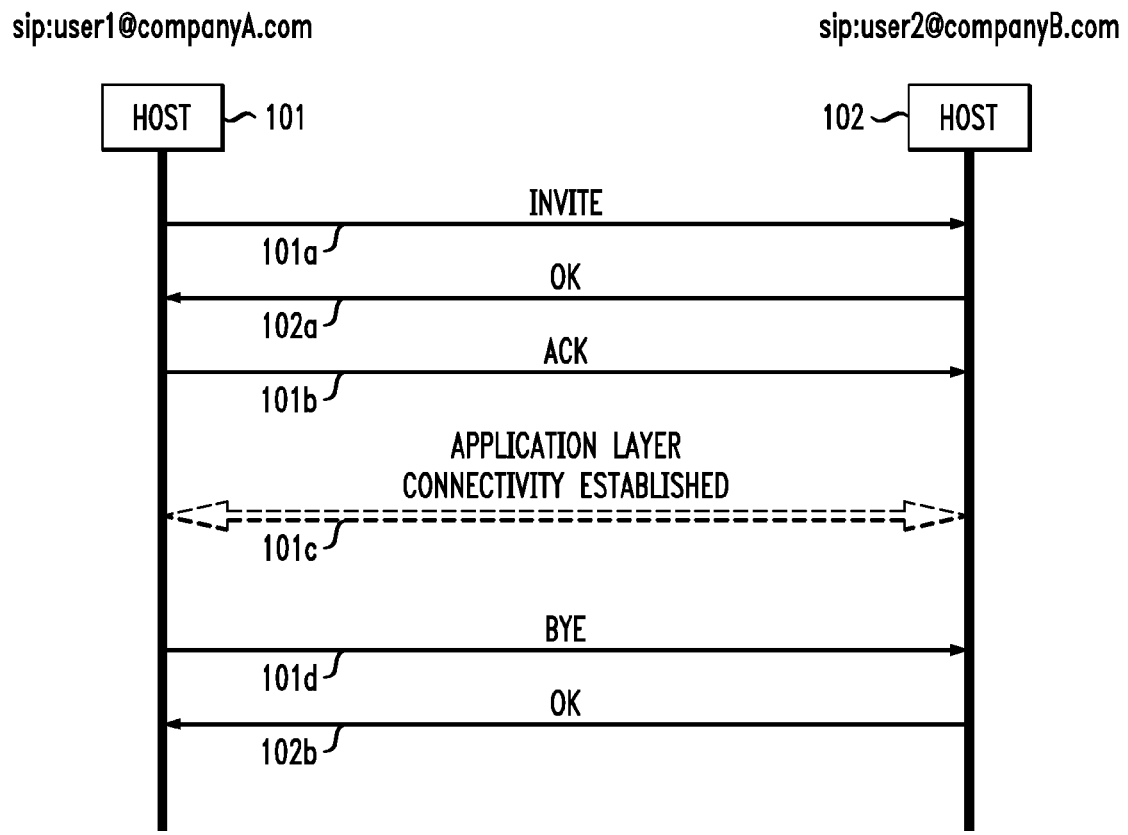
FIG. 1 shows a sample data flow diagram for a basic call setup between a first SIP host and a second SIP host.
Figure 2:
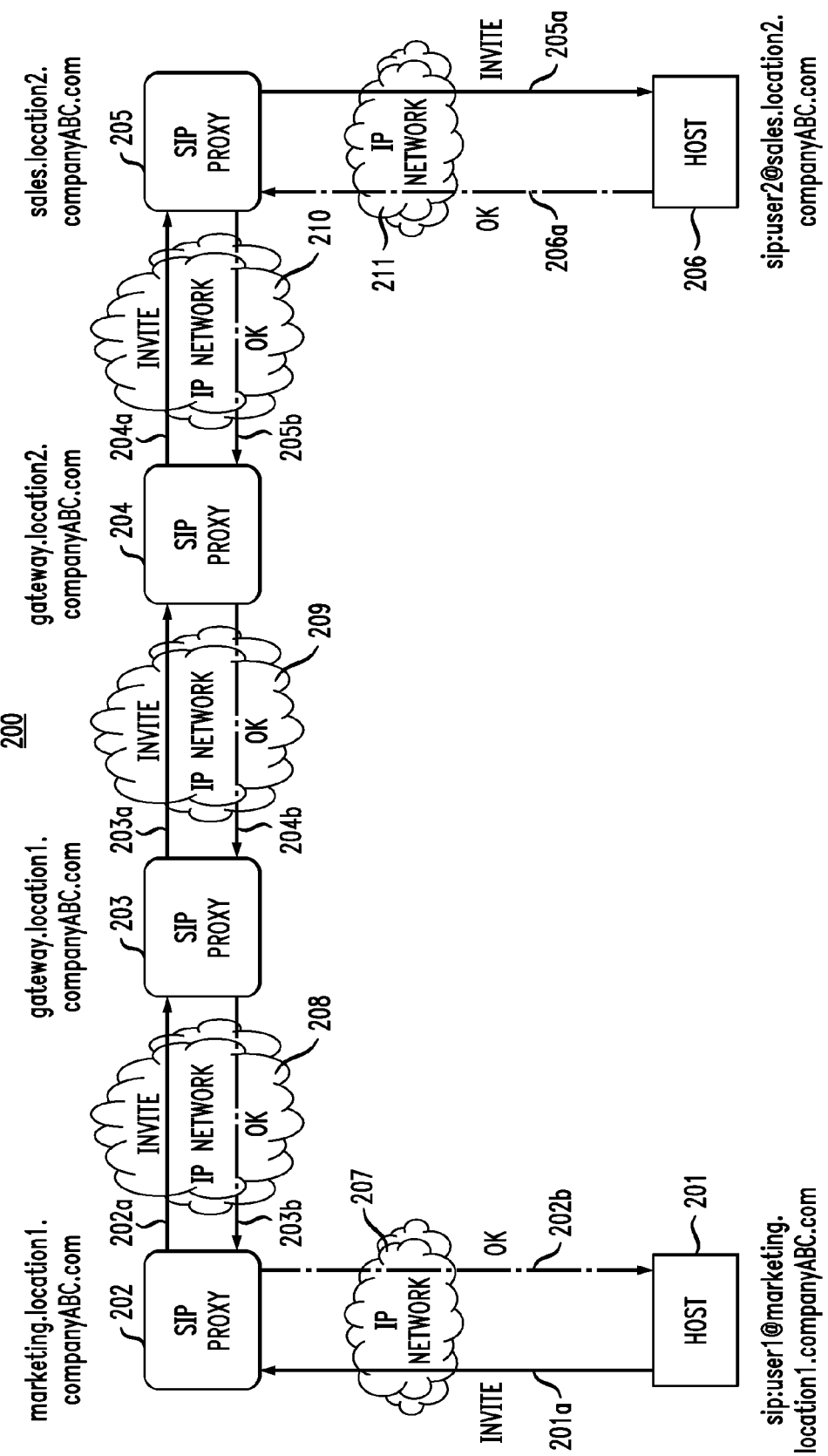
FIG. 2 shows an example of using SIP routing to set up a call in a network.
Figure 3:
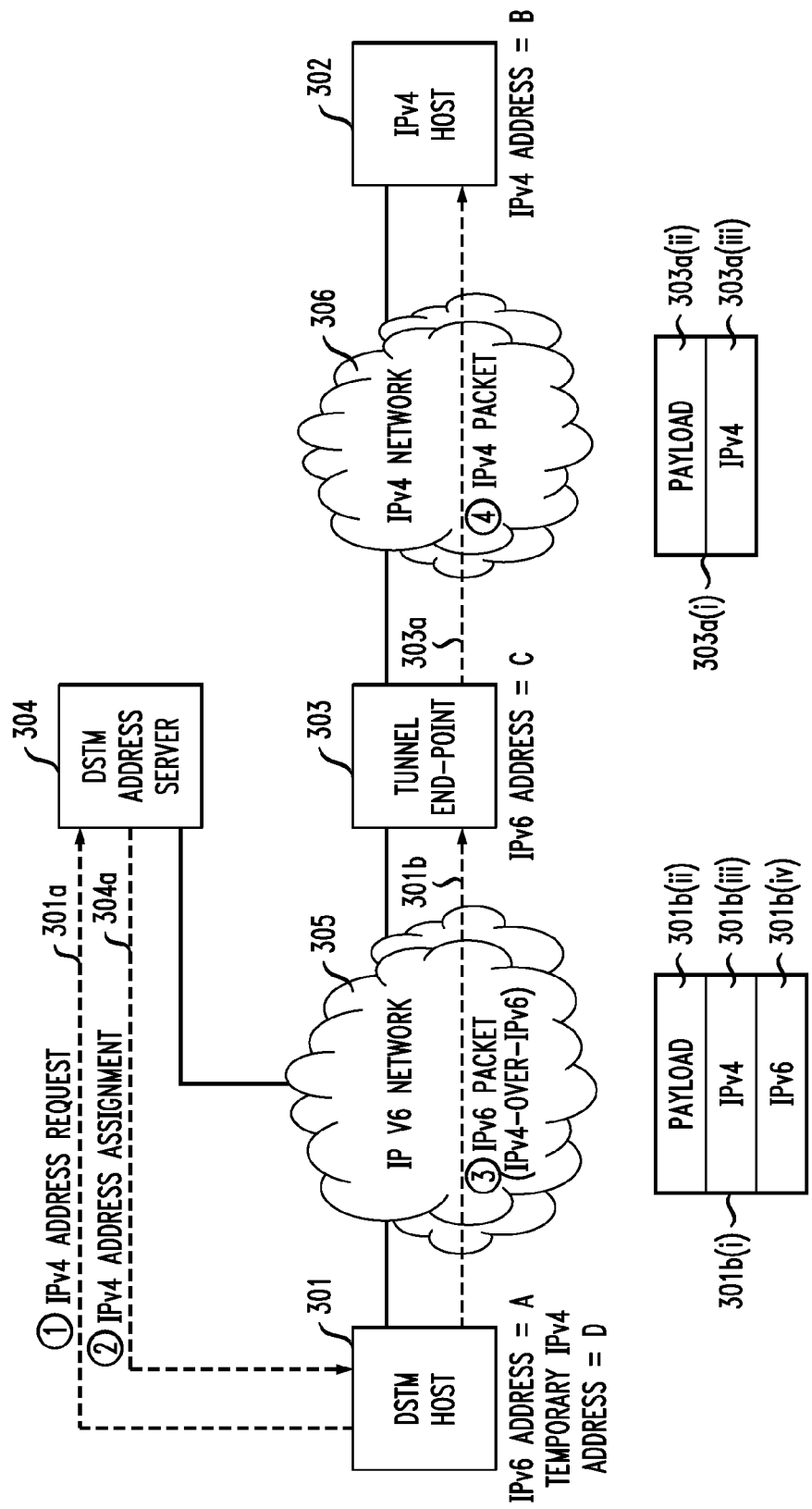
FIG. 3 shows a sample network illustrating the prior-art operation of DSTM.
Figure 4:
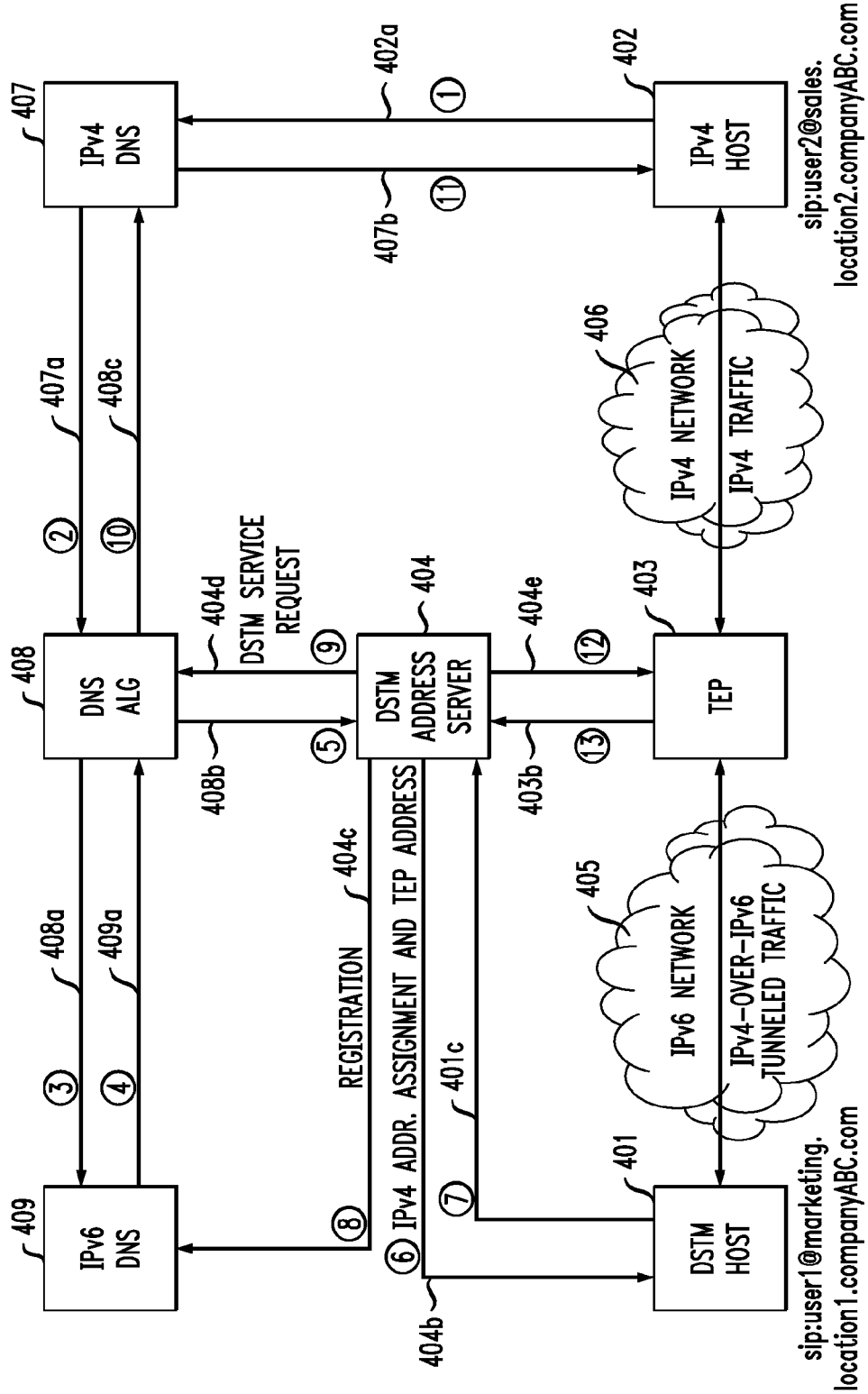
FIG. 4 shows another sample network illustrating a prior-art proposed enhancement to DSTM.
Figure 5:
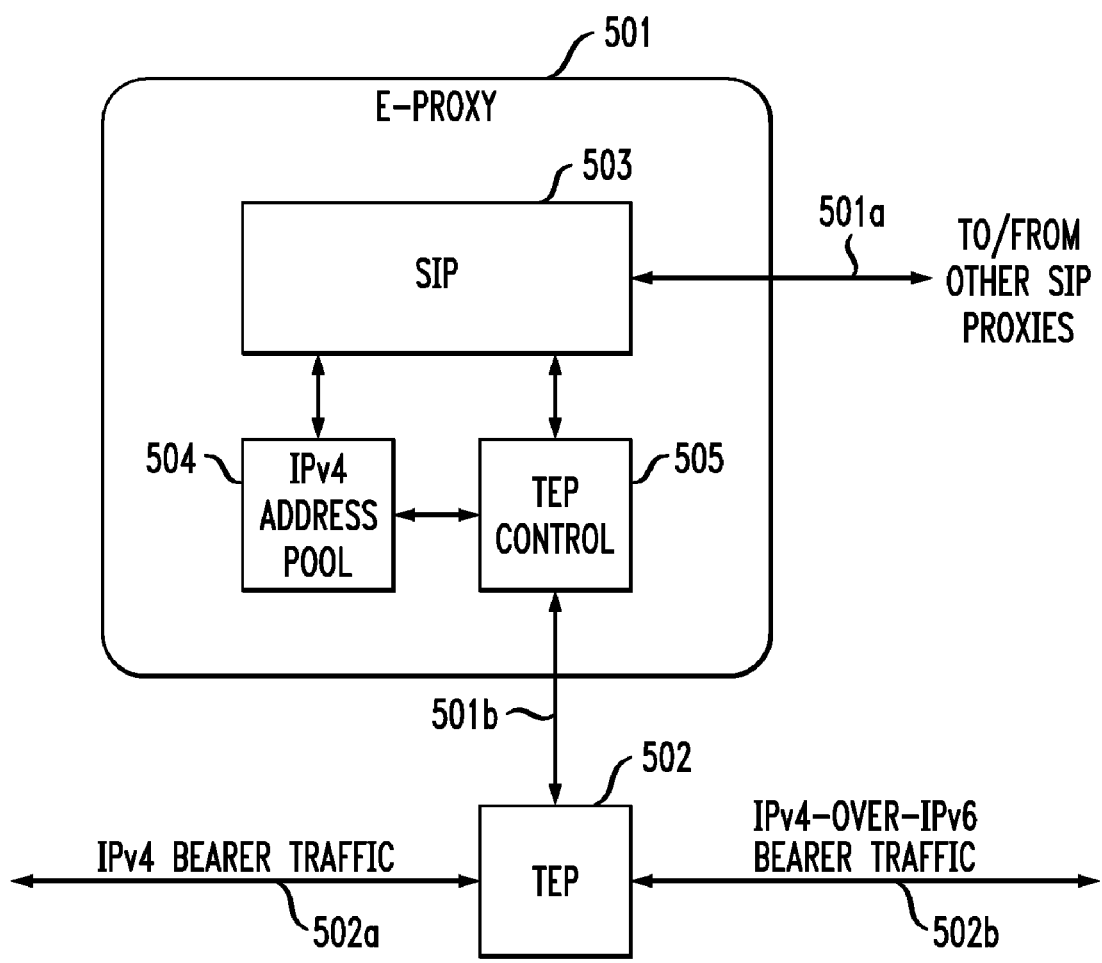
FIG. 5 shows a block diagram of a network segment comprising an e-proxy in accordance with one embodiment of the present invention.

FIG. 5 shows a block diagram of a network segment comprising e-proxy 501 and TEP 502. E-proxy 501 comprises SIP module 503, IPv4 address-pool module 504, and TEP control module 505, where the three are interconnected. SIP module 503 is connected to other SIP proxies via path 501a. SIP module 503 can interact with (1) other e-proxies, (2) IPv4 SIP proxies, and (3) IPv6 SIP proxies, via path 501a. IPv6 SIP proxies can be IPv6-only SIP proxies or IPv4/IPv6 SIP proxies. IPv4 address pool 504 manages a pool of IPv4 addresses which e-proxy 501 can assign to dual-stack hosts as necessary. The assignment of an IPv4 address from address pool 504 to a dual-stack host can be made for a particular set of one or more calls or can be for a determined time period.

TEP control module 505 manages TEP 502 via path 501b. TEP management includes sending instructions to TEP 502 to bind and unbind the IPv6 address of a dual-stack host (not shown) to and from an assigned temporary IPv4 address for the dual-stack host. These bind and unbind instructions (a) include one IPv6 address and one IPv4 address and (b) may be conveyed using (1) the Diameter protocol (described in RFC 3588, incorporated herein by reference in its entirety), (2) Megaco (described in RFC 3015, incorporated herein by reference in its entirety), or (3) any other suitable protocol. TEP management also includes receiving acknowledgment messages in response to the bind and unbind instructions.

TEP 502 communicates with an IPv4 host (not shown) over an IPv4 network (not shown) via path 502a, which carries IPv4 bearer traffic. TEP 502 communicates with the dual-stack host over an IPv6 network (not shown) via path 502b, which carries IPv4-over-IPv6 bearer traffic. TEP 502 encapsulates messages from the IPv4 host to the dual-stack host and decapsulates messages from the dual-stack host to the IPv4 host. In one embodiment, TEP 502 is embodied in an apparatus physically distinct from an apparatus embodying e-proxy 501. In another embodiment, TEP 502 is integrated within e-proxy 501.

FIG. 6 shows network 600, which includes e-proxy 601 for facilitating communication between local IPv6 network 605 and local IPv4 network 608. E-proxy 601 has the URI marketing.location1.companyABC.com. Dual-stack host 602, which is connected to local IPv6 network 605, has IPv6 address A and hosts a first user whose SIP URI is sip:user1@marketing.location1.companyABC.com. Local IPv6 network 605 is further connected to e-proxy 601, TEP 604, and zero or more other IPv6 hosts 609. TEP 604, whose IPv6 address is C, is also connected to e-proxy 601 and IPv4 core network 606. IPv4 core network 606 is further connected to e-proxy 601, local IPv4 network 608, SIP proxy 607, zero or more other local IPv6 networks 612 via corresponding TEPs 613, and zero or more other local IPv4 networks 611. SIP proxy 607, which is also connected to local IPv4 network 608, has the URI sales.location2.companyABC.com and can be a prior-art IPv4 SIP proxy or an e-proxy in accordance with an embodiment of the present invention. Local IPv4 network 608 is also connected to IPv4 host 603 and zero or more other IPv4 hosts 610. IPv4 host 603 has IPv4 address B and hosts a second user whose SIP URI is sip:user2@sales.location2.companyABC.com.

Figure 7:
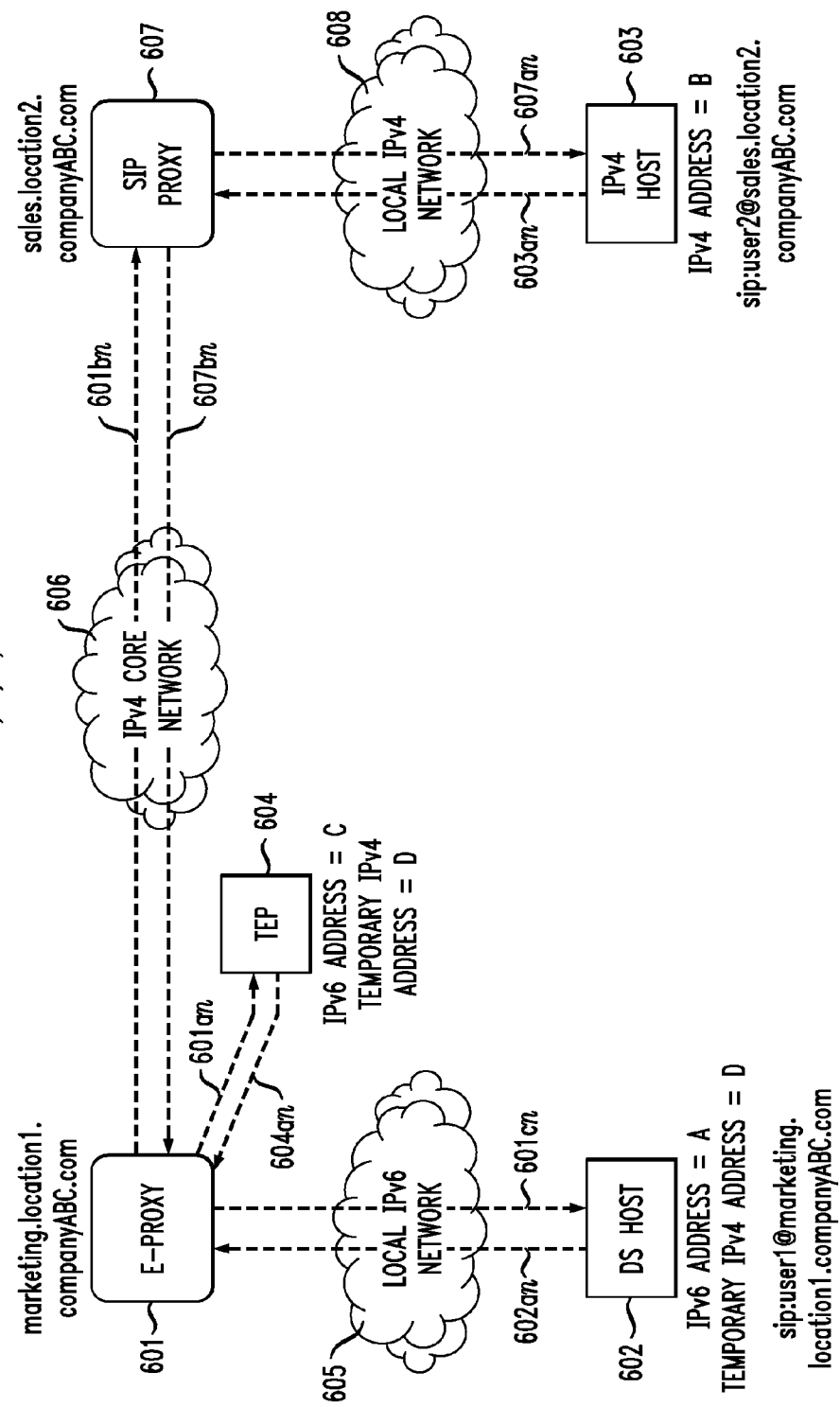
FIG. 7 shows a portion of network 600 of FIG. 6, and illustrates basic signaling call flow for the four scenarios when a first user at DS host 602 of FIG. 6 initiates or terminates a call to a second user at IPv4 host 603, and vice versa.

FIG. 7 shows a portion of network 600 of FIG. 6, and illustrates basic signaling call flow for the four scenarios when the first user at DS host 602 of FIG. 6 initiates (i.e., sets up) or terminates (i.e., ends) a call to the second user at IPv4 host 603, and vice versa. These situations are described in the paragraphs below. The descriptions below refer to messages with suffixes 1, 2, 3, 4, which correspond to particular call set-up or termination scenarios, while the labels of the corresponding messages in FIG. 7 have the generic suffix n, which corresponds to 1, 2, 3, or 4. Suffix 1 corresponds to the scenario where the first user initiates a call to the second user. Suffix 2 corresponds to the scenario where the second user initiates a call to the first user. Suffix 3 corresponds to the scenario where the first user terminates a call with the second user. Suffix 4 corresponds to the scenario where the second user terminates a call with the first user.

Scenario 1

If the first user tries to initiate a call with the second user, then DS host 602 sends SIP INVITE message 602a1 to its home SIP proxy, e-proxy 601, via local IPv6 network 605. INVITE message 602a1 includes parameters indicating the address and port where DS host 602 would like to receive traffic, e.g., address A and port P. Upon receipt of INVITE message 602a1, e-proxy 601 determines that the second user is not hosted in local IPv6 network 605, that the call will have to go through IPv4 core network 606, and that DSTM service will be required. E-proxy 601 assigns to DS host 602 temporary IPv4 address D, taken from E-proxy 601's IPv4 address pool. E-proxy 601 then selects TEP 604 as the appropriate TEP for DS host 602 and sends BIND command 601a1 to TEP 604, which binds DS host 602's IPv6 address A to temporary IPv4 address D. Temporary IPv4 address D is also associated with TEP 604 so that IPv4 bearer traffic packets addressed to IPv4 address D would be routed to TEP 604. TEP 604 acknowledges BIND command 601a1 with ACK message 604a1. It should be noted that, if DS host 602 already has an assigned IPv4 address that is also associated with TEP 604, then e-proxy 601 can use that same IPv4 address and omit sending BIND command 601a1 (thus, also eliminating ACK message 604a1). It should also be noted that BIND command 601a1, and consequently, ACK message 604a1, can be exchanged later in the process—anytime prior to sending message 601c1, described below.

E-proxy 601 forwards corresponding, but modified, INVITE message 601b1 to SIP proxy 607 via IPv4 core network 606. The SDP parameters of INVITE message 601b1 indicate that DS host 602 wishes to receive bearer traffic at IPv4 address D and port P, rather than at IPv6 address A. INVITE message 607a1 is substantially similar to INVITE message 601b1, except for the modifications noted above and optional modification to the "via" section to delineate the path traversed by the INVITE message. INVITE message 601b1 might go through one or more intermediary SIP proxies (not shown) in IPv4 core network 606, and each may modify INVITE message 601b1 in a manner similar to the path-delineating modifications discussed above. Upon receipt of INVITE message 601b1, SIP proxy 607 forwards corresponding INVITE message 607a1 to IPv4 host 603 via local IPv4 network 608.

IPv4 host 603 accepts the call set-up request by sending OK message 603a1 for DS host 602 to SIP proxy 607 via local IPv4 network 608. OK message 603a1 indicates that IPv4 host 603 wishes to receive bearer traffic at IPv4 address B and port Q. SIP proxy 607 forwards corresponding OK message 607b1 to e-proxy 601 via IPv4 core network 606. E-proxy 601 then forwards corresponding, but modified, OK message 601c1 to DS host 602 via local IPv6 network 605. The parameters of OK message 601c1 indicates that (1) DSTM service is invoked, (2) the peer host's IPv4 address is B, (3) DS host 602's assigned IPv4 address for this call is D, and (4) TEP 604's IPv6 address is C. DS host 602 then responds with an ACK acknowledgement message (not shown) that is routed to IPv4 host 603 over substantially the same path as the INVITE message. Once the call is set up, bearer traffic, as described below in conjunction with FIG. 8, will be routed through TEP 604 and does not need to go through any SIP proxies.

Scenario 2

If the second user tries to initiate a call with the first user, then IPv4 host 603 sends INVITE message 603a2 for the second user to its home SIP proxy, SIP proxy 607, via local IPv4 network 608. INVITE message 603a2 indicates that IPv4 host 603 wishes to receive bearer traffic at IPv4 address B and port Q. SIP proxy 607 determines that the first user is not hosted locally and forwards corresponding INVITE message 607b2 to e-proxy 601 via IPv4 core network 606 and zero or more intermediary SIP proxies. E-proxy 601, where DS host 602 is registered, determines that DSTM service is required because the INVITE message is from an IPv4 host but is addressed to a user at a host, DS host 602, with an IPv6 address. E-proxy 601 assigns temporary IPv4 address D to DS host 602 and sends corresponding BIND command 601a2, which binds IPv6 address A to IPv4 address D, to TEP 604. Temporary IPv4 address D is also associated with TEP 604 so that IPv4 bearer traffic packets addressed to IPv4 address D would be routed to TEP 604. TEP 604 responds with ACK message 604a2. It should be noted that, if DS host 602 already has an assigned IPv4 address that is also associated with TEP 604, then e-proxy 601 can use that same IPv4 address and omit sending BIND command 601a2 (thus, also eliminating ACK message 604a2). It should also be noted that the BIND and, thus, ACK messages can be sent later in the process, such as prior to sending message 601b2, described below.

E-proxy 601 then forwards corresponding, but modified, INVITE message 601c2 to DS host 602 via local IPv6 network 605. INVITE message 601c2 indicates that (1) DSTM service is invoked, (2) the assigned temporary IPv4 address is address D, (3) TEP 604's IPv6 address is C, and (4) the peer host's address is IPv4 address B. DS host 602 accepts the call request by sending OK message 602a2 for IPv4 host 603 via substantially the reverse path of the INVITE message. E-proxy 601 receives OK message 602a2 and forwards corresponding OK message 601b2 to SIP proxy 607. OK message 602a2 may be in a format IPv4 host 603 can understand, or if not, e-proxy 601 may make modifications so that corresponding OK message 601b2 is in a format comprehensible to IPv4 host 603. SIP proxy 607 then forwards corresponding OK message 607a2 to IPv4 host 603, where OK message 607a2 indicates assigned temporary IPv4 address D as the peer host's address. IPv4 host 603 responds with an ACK message (not shown) to DS host 602, which follows substantially the same route as INVITE message 603a2 and the corresponding INVITE messages.

As can be seen for both scenarios 1 and 2, the described embodiment allows for the correct routing of SIP messages, and the number of additional steps over a non-hybrid network scenario is minimal—one transaction between e-proxy 601 and TEP 604. Additional time savings are realized if the TEP is integrated with the e-proxy. As noted above, and described below, the bearer traffic of the actual call between the first and second users is routed through TEP 604 and need not be routed through any SIP proxies.

Scenario 3

If the first user wishes to terminate an ongoing call with the second user, then DS host 602 sends BYE message 602a3 for IPv4 host 603 to e-proxy 601, which forwards corresponding BYE message 601b3 to SIP proxy 607, which, in turn, forwards corresponding BYE message 607a3 to IPv4 host 603. If BYE message 602a3 is in a format that would make it not comprehensible to IPv4 host 603, then e-proxy makes modifications so that corresponding BYE message 601b3 is in a format comprehensible to IPv4 host 603. IPv4 host 603 indicates acceptance of the call termination by replying with OK message 603a3 for DS host 602 sent to SIP proxy 607. SIP proxy 607 forwards corresponding OK message 607b3 to e-proxy 601, which, in turn, forwards corresponding OK message 601c3 to DS host 602. E-proxy 601 also sends UNBIND command 601a3 to TEP 604 to unbind IPv6 address A of DS host 602 from temporary IPv4 address D. TEP 604 may delay execution of UNBIND command 601a3 for a short period to allow en-route bearer traffic packets to reach their destinations. TEP 604 acknowledges UNBIND command 601a3 with ACK message 604a3.

Scenario 4

If the second user wishes to terminate the call, then IPv4 host 603 sends BYE message 603a4 for DS host 602 to SIP proxy 607, which forwards corresponding BYE message 607b4 to e-proxy 601, which, in turn forwards corresponding BYE message 601c4 to DS host 602. BYE message 601c4 may contain modifications by e-proxy 601 in addition to optional changes to the "via" header. DS host 602 indicates acceptance of the call termination by forwarding OK message 602a4 for IPv4 host 603 to e-proxy 601. E-proxy 601 forwards corresponding OK message 601b4 to SIP proxy 607, which, in turn, forwards corresponding OK message 607a4 to IPv4 host 603. If OK message 602a4 is in a format that would make it not comprehensible to IPv4 host 603, then e-proxy makes modifications so that corresponding OK message 601b4 is in a format comprehensible to IPv4 host 603. E-proxy 601 also sends UNBIND command 601a4 to TEP 604 to unbind IPv6 address A of DS host 602 from temporary IPv4 address D. TEP 604 may delay implementation of UNBIND command 601a4 for a short period to allow en-route bearer traffic packets to reach their destinations. TEP 604 acknowledges UNBIND command 601a4 with ACK message 604a4

It should be noted that the INVITE, BYE, and OK messages may have "via" header sections that are modified as they traverse their respective paths, as described above.

Figure 8:
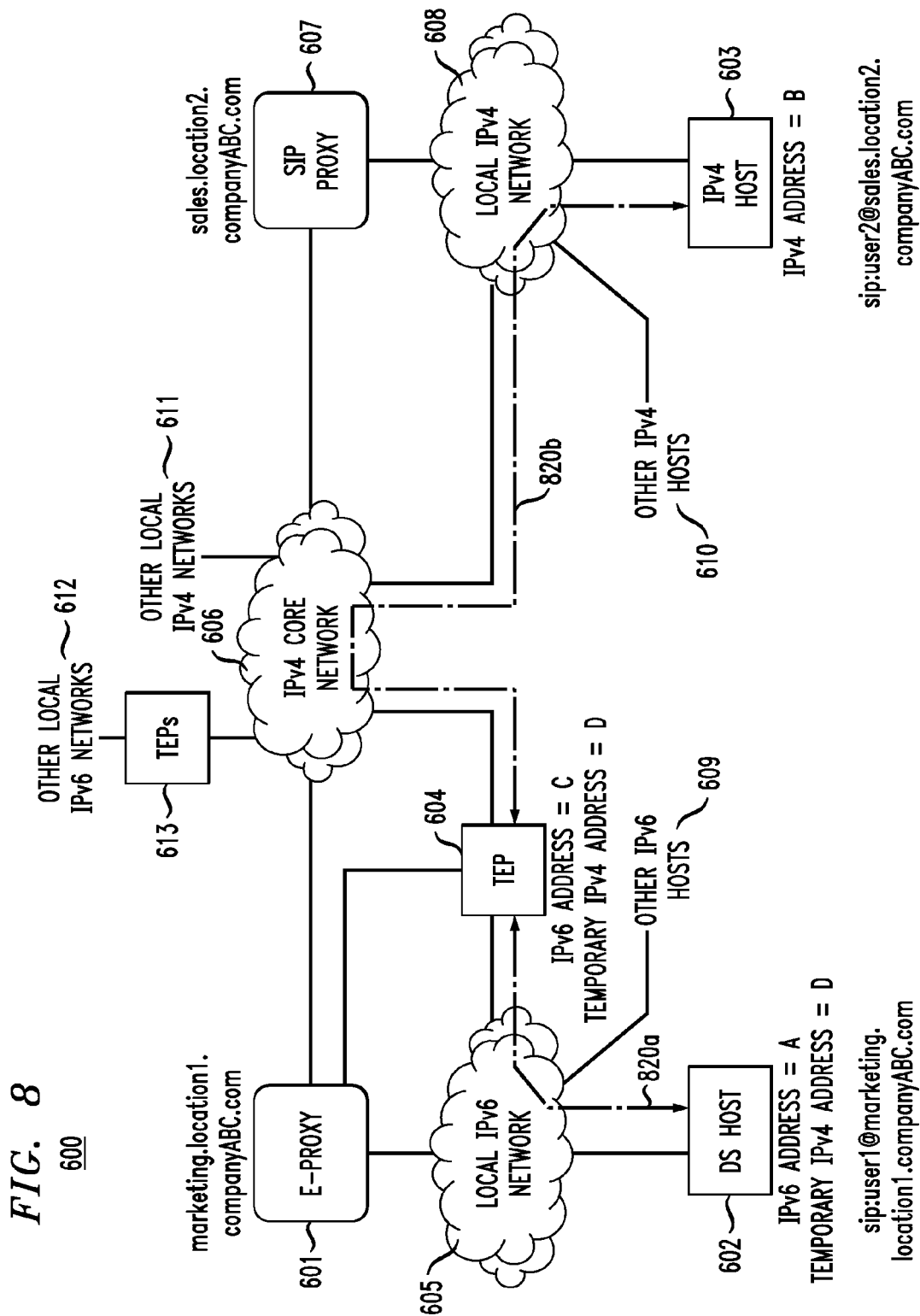
FIG. 8 shows the path of bearer traffic between DS host 602 and IPv4 host 603 through network 600 of FIG. 6, after a call has been set up between them.
Figure 9:
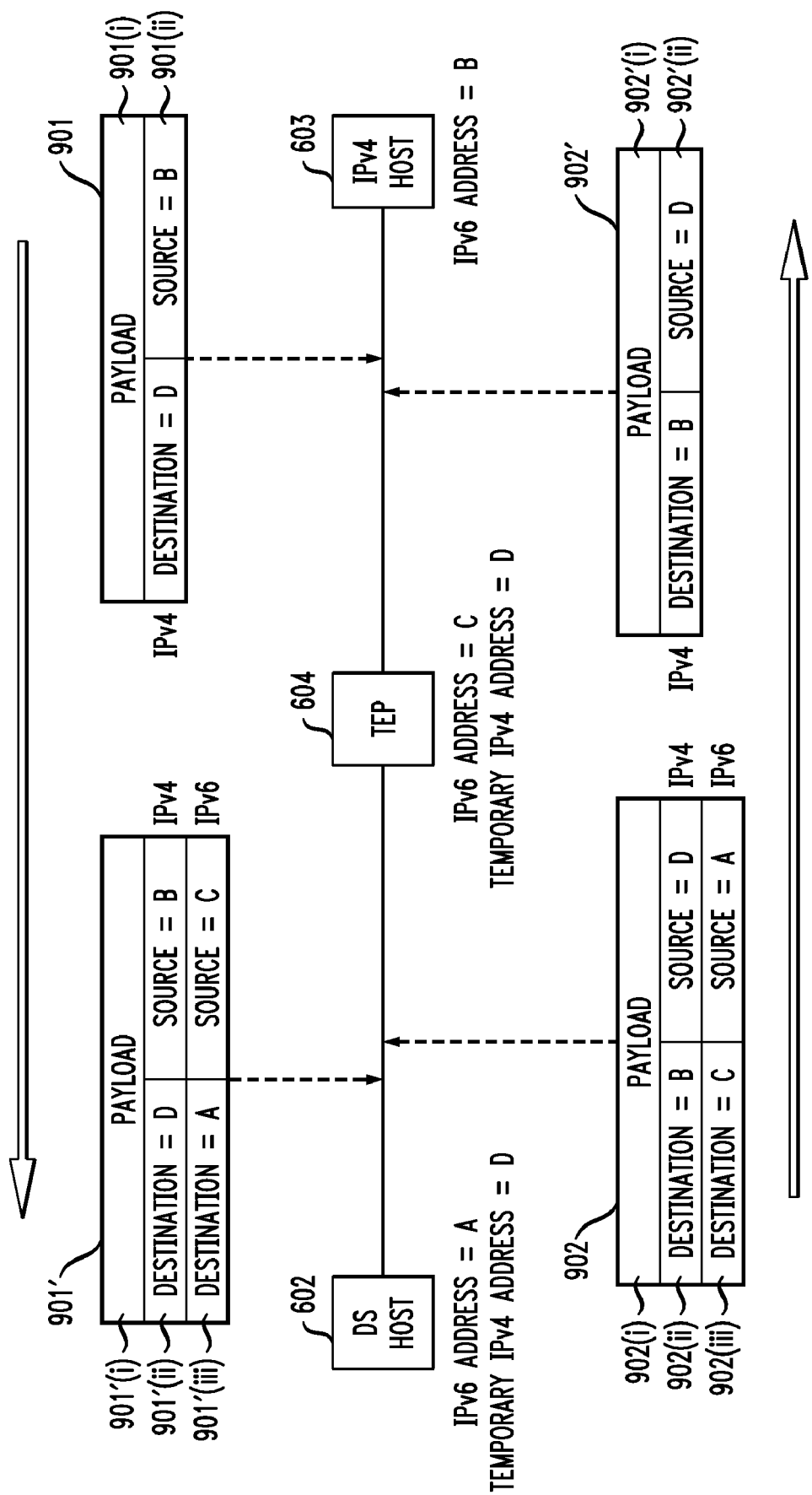
FIG. 9 illustrates the encapsulation and decapsulation of bearer-traffic packets performed by DS host 602, TEP 604, and IPv4 host 603 of FIG. 8.

For ease of reference, the four scenarios described above are summarized in Table I, where, for each scenario, the messages order goes from top to bottom. Note that the BIND, UNBIND, and corresponding ACK messages may be sent at other suitable points in each scenario's respective sequence.

and IPv4 host 603 of FIG. 8. The top part of FIG. 9 illustrates the transmission of packet 901 from IPv4 host 603 to DS host 602 via TEP 604, while the bottom part of FIG. 9 illustrates the transmission of packet 902 from DS host 602 to IPv4 host 603 via TEP 604.

If IPv4 host 603 wants to deliver payload 901(i) to its peer host, DS host 602, then IPv4 host 603 encapsulates payload 901(i) with IPv4 header 901(ii) which includes destination IPv4 address D and source IPv4 address B to form packet 901. Upon receipt of packet 901, TEP 604 encapsulates packet 901 with an IPv6 header and transmits corresponding IPv6 packet 901' to DS host 602. IPv6 packet 901' comprises (a) payload 901'(i), which is substantially identical to payload 901(i), (b) IPv4 header 901'(ii), which is substantially identical to IPv4 header 901(ii), and (c) IPv6 header 901'(iii), which includes IPv6 destination address A for DS host 602 and IPv6 source address C, which is the IPv6 address for TEP 604. DS host 602 decapsulates packet 901' to retrieve payload 901'(i).

If DS host 602 wants to deliver payload 902(i) it its peer host, IPv4 host 603, then DS host 602 encapsulates payload 902(i) with (a) IPv4 header 902(ii), which includes IPv4 destination address B and IPv4 source address D and (b) IPv6 header 902(iii) which includes IPv6 destination address C and IPv6 source address A. Upon receipt of packet 902, TEP 604 decapsulates packet 902 by removing IPv6 header 902 (iii). TEP 604 transmits to IPv4 host 603 corresponding IPv4 packet 902', which comprises (a) payload 902'(i), which is substantially identical to payload 902(i), and (b) IPv4 header

TABLE I

| Scenario 1 | | Scenario 2 | | Scenario 3 | | Scenario 4 | |
|---|---|---|---|---|---|---|---|
| Message | Type | Message | Type | Message | Type | Message | Type |
| 602a1 | INVITE | 603a2 | INVITE | 602a3 | BYE | 603a4 | BYE |
| 601b1 | INVITE | 607b2 | INVITE | 601b3 | BYE | 607b4 | BYE |
| 607a1 | INVITE | 601c2 | INVITE | 607a3 | BYE | 601c4 | BYE |
| 603a1 | OK | 602a2 | OK | 603a3 | OK | 602a4 | OK |
| 607b1 | OK | 601a2 | BIND | 607b3 | OK | 601a4 | UNBIND |
| 601a1 | BIND | 604a2 | ACK | 601a3 | UNBIND | 604a4 | ACK |
| 604a1 | ACK | 601b2 | OK | 604a3 | ACK | 601b4 | OK |
| 601c1 | OK | 607a2 | OK | 601c3 | OK | 607a4 | OK |

FIG. 8 shows the path of bearer traffic between DS host 602 and IPv4 host 603 through network 600 of FIG. 6, after a call has been set up between them. IPv4 packets traverse path 820b between IPv4 host 603 and TEP 604 via local IPv4 network 608 and core IPv4 network 606. Encapsulated IPv4, a.k.a. IPv4-over-IPv6, packets traverse path 820a between TEP 604 and DS host 602 via local IPv6 network 605. DS host 602 performs IPv4 and IPv6 encapsulation and decapsulation for data payloads; TEP 604 performs IPv6 encapsulation and decapsulation for IPv4-encapsulated data payloads; while IPv4 host 603 performs IPv4 encapsulation and decapsulation for data payloads. Note that, as indicated in FIG. 8, no bearer traffic needs to be routed through any SIP proxies, such as e-proxy 601 or SIP proxy 607. Also note that IPv6 packets addressed to IPv6 address C are routed to TEP 604, as are IPv4 packets addressed to temporary IPv4 address D. It should also be noted that temporary IPv4 address D may be associated with TEP 604 even when temporary IPv4 address D is not assigned to DS host 602, such as when IPv4 address D is unassigned or is assigned to another DS host (not shown) or one of zero or more IPv6 hosts 609.

FIG. 9 illustrates the encapsulation and decapsulation of bearer-traffic packets performed by DS host 602, TEP 604, 902'(ii), which is substantially identical to IPv4 header 902 (ii). IPv4 host 603 decapsulates packet 902' to retrieve payload 902'(i).

FIG. 10 shows network 1000, which is substantially similar to network 600 of FIG. 6, but where core network 1006 is an IPv6 network. Furthermore, in FIG. 10, elements similar to elements of FIG. 6 are similarly named, but with a different prefix, where (a) TEP 1004 is connected between core IPv6 network 1006 and local IPv4 network 1008, (b) e-proxy 1001 is the home SIP proxy for IPv4 host 1003 and is connected between IPv6 core network 1006 and local IPv4 network 1008, and (c) the home SIP proxy for DS host 1002 is IPv6 SIP proxy 1007, which can be any SIP proxy capable of handling IPv6 communications or an e-proxy in accordance with an embodiment of the present invention.

FIG. 11 shows a portion of network 1000 of FIG. 10, and illustrates basic signaling call flow for the four scenarios when the first user at DS host 1002 initiates or terminates a call to the second user at IPv4 host 1003, and vice versa. The signaling call flow is substantially similar to the signaling call flow described above in reference to FIG. 7, where the core network is an IPv4 core network. It should be noted, that, as in the description above in reference to e-proxy 601 of FIG. 7, e-proxy 1001 makes any appropriate modifications to INVITE, OK, BYE, and other SIP messages it conveys for proper comprehension by DS host 1002 and IPv4 host 1003.

The four scenarios are summarized in Table II, where messages with suffixes 1, 2, 3, and 4 correspond to a particular call setup or termination scenario. The labels of the corresponding messages in FIG. 11 have the generic suffix n, corresponding to 1, 2, 3, or 4. Suffix 1 corresponds to Scenario 1, where the first user, at DS host 1002, initiates a call to the second user. Suffix 2 corresponds to Scenario 2, where the second user, at IPv4 host 1003, initiates a call to the first user. Suffix 3 corresponds to Scenario 3, where the first user terminates a call with the second user. Suffix 4 corresponds to Scenario 4, where the second user terminates a call with the first user. It should be noted that, as in the description above for FIG. 7, the BIND, UNBIND, and corresponding ACK messages may be sent at other suitable points in each scenario's respective sequence. It should also be noted that the ACK messages sent by DS host 1002 and IPv4 host 1003 after receiving respective OK messages in response to respective INVITE messages are not shown and are not included in the summary table below.

If the first user wishes to set up a call with the second user, then DS host 1202 sends INVITE message 1202a, designating its IPv6 address A and port P, to its home SIP proxy, e-proxy 1201. E-proxy 1201 determines that the second user is not hosted locally and that the INVITE message will need to be forwarded. E-proxy 1201 might not be able to immediately determine whether DSTM service will be required because, for example, the core network 1206 supports both IPv4 and IPv6 traffic. In this situation, determining whether DSTM service will be required may entail generating and sending an information request and then waiting for a reply. Instead, e-proxy 1201 can prepare for the possibility that DSTM service would be required for this call setup without first determining whether DSTM service would actually be required. This preparation may reduce the overall number of transactions performed and the consequent delay involved in the call set up. Determining whether DSTM service would be required can be performed after receiving the corresponding OK message.

E-proxy 1201 obtains temporary IPv4 address D1 from its IPv4 address pool to assign to DS host 1202. Temporary IPv4

TABLE II

| Scenario 1 | | Scenario 2 | | Scenario 3 | | Scenario 4 | |
|---|---|---|---|---|---|---|---|
| Message | Type | Message | Type | Message | Type | Message | Type |
| 1002a1 | INVITE | 1003a2 | INVITE | 1002a3 | BYE | 1003a4 | BYE |
| 1007b1 | INVITE | 1001a2 | BIND | 1007b3 | BYE | 1001a4 | UNBIND |
| 1001a1 | BIND | 1004a2 | ACK | 1001a3 | UNBIND | 1004a4 | ACK |
| 1004a1 | ACK | 1001b2 | INVITE | 1004a3 | ACK | 1001b4 | BYE |
| 1001c1 | INVITE | 1007a2 | INVITE | 1001c3 | BYE | 1007a4 | BYE |
| 1003a1 | OK | 1002a2 | OK | 1003a3 | OK | 1002a4 | OK |
| 1001b1 | OK | 1007b2 | OK | 1001b3 | OK | 1007b4 | OK |
| 1007a1 | OK | 1001c2 | OK | 1007a3 | OK | 1001c4 | OK |

Similar to network 600 of FIG. 7, once a call has been set up, bearer traffic flows through TEP 1004 and does not need to go through any SIP proxies.

In one implementation of network 600 of FIG. 7, if e-proxy 601 receives an INVITE message for the second user from the first user at DS host 602, which is registered with e-proxy 601, then e-proxy 601 determines whether DSTM service will be required based on one or more of: the second user's SIP URI, configuration information maintained by e-proxy 601, access to a SIP URI information database, and naming conventions used for SIP URIs (such as indicators that a recipient is a DS host or an IPv4 host). Keeping the above factors available for reference typically requires the performance of management routines by e-proxy 601 as part of (a) determining the need for DSTM and/or (b) periodic maintenance.

FIG. 12. shows network 1200, which includes core network 1206, which supports both IPv4 and IPv6 communication. Elements of network 1200 that are similar to elements of network 600 of FIGS. 6-8 are similarly labeled, but with a different prefix. Network 1200 comprises DS host 1202 (which hosts a first user whose SIP URI is sip:user1@XYX.com), local IPv6 network 1205, e-proxy 1201, TEP 1204 (whose IPv6 address is C), TEP 1224 (whose IPv6 address is E), SIP proxy 1207, local network 1228, and host 1223 (which hosts a second user whose SIP URI is user2@JKL.com). DS host 1202 is connected to e-proxy 1201 via local IPv6 network 1205. E-proxy 1201 is connected to SIP proxy 1207 via IPv4/IPv6 core network 1206. SIP proxy 1207 is connected to host 1223 via local network 1228.

address D1 is associates with TEP 1204. E-proxy 1201 modifies the INVITE message received and sends corresponding INVITE message 1201b for the second user via core network 1206. INVITE message 1201b includes IPv4 call setup information, including temporary IPv4 address D1, in a required SIP message body section (as defined above in the background section) and IPv6 call setup information, including IPv6 address A, in an optional SIP message body section. If, for example, host 1223 is an IPv4 host, local network 1228 is an IPv4 network, and SIP proxy 1207 is an IPv4 SIP proxy, then SIP proxy 1207 will ignore the IPv6 information in the optional section of INVITE message 1201b because that IPv6 information would be unintelligible to SIP proxy 1207. SIP proxy 1207 will process the IPv4 information in the required section, and send corresponding INVITE message 1207a to host 1223, which will accept by replying with an OK message (not shown).

When e-proxy 1201 receives the corresponding OK message from the second user, e-proxy 1201 concludes that DSTM service is necessary, and sends an appropriate BIND command (not shown) to TEP 1204, as well as a corresponding, but modified, OK message (not shown) to DS host 1202, including temporary IPv4 address D1 and IPv6 address C of TEP 1204. If DSTM service will be needed, then the bearer traffic for the call will then be tunneled as IPv4-over-IPv6 between DS host 1202 and TEP 1204. No bearer traffic needs to be routed through any SIP proxies.

Optionally, in order to have more of the bearer traffic transmission path going over IPv6 than IPv4, e-proxy 1201 can use TEP 1224 instead of TEP 1204. E-proxy 1201 obtains temporary IPv4 address D2 from its IPv4 address pool to assign to DS host 1202 and associate with TEP 1224. INVITE message 1201b includes temporary IPv4 address D2, which is associated with TEP 1224, in the above-referenced required section, rather than IPv4 address D1, which is associated with TEP 1204. E-proxy 1201 sends an appropriate BIND command (not shown) to TEP 1224 instead of TEP 1204, and, as a result, the corresponding OK message to DS host 1202 would include TEP 1224's IPv6 address E instead of TEP 1204's IPv6 address C. If DSTM service will be needed, then the bearer traffic for the call will then be tunneled as IPv4-over-IPv6 traffic between DS host 1202 and TEP 1224. None of this bearer traffic needs to be routed through any SIP proxies.

If, for example, host 1223 is an IPv4 host, local network 1228 is an IPv4 network, but SIP proxy 1207 is an e-proxy, then SIP proxy 1207 will process the IPv6 information in the optional section and will determine to provide DSTM service so as have more of the bearer traffic transmission path going over IPv6 than IPv4. SIP proxy 1207 will send an appropriate BIND command to TEP 1224, and will forward corresponding INVITE message 1207a to host 1223 based on the information in INVITE message 1201b. It should be noted that, instead of using temporary IPv4 address D2 provided by e-proxy 1201, SIP proxy 1207 may override the parameters in the required IPv4 section of INVITE message 1201b and substitute a temporary IPv4 address (not shown) from its own IPv4 address pool. Host 1223 accepts the invitation with an OK reply (not shown). SIP proxy 1207 will modify the OK reply to include TEP 1224's IPv6 address E. When e-proxy 1201 receives the corresponding OK message, e-proxy 1201 determines that DSTM service is being provided by the second user's home SIP proxy and forwards a corresponding OK message to DS host 1202. The bearer traffic for the call will then be tunneled as IPv4-over-IPv6 between DS host 1202 and TEP 1224. None of this bearer traffic needs to be routed through any SIP proxies.

If, for example, host 1223 is an IPv6 or DS host, local network 1228 is an IPv6 network, and SIP proxy 1207 is an IPv6 SIP proxy or an e-proxy, then SIP proxy will process the IPv6 information in the optional section so as to override the IPv4 information in the required section of INVITE 1201b and send corresponding INVITE message 1207a to host 1223. Host 1223 accepts the invitation by replying with an OK message (not shown). When e-proxy 1201 receives the corresponding OK message (not shown), e-proxy 1201 concludes that DSTM service is not required for this call and releases temporary IPv4 address D1 or D2 back to e-proxy 1201's IPv4 address pool. The bearer traffic will then not be tunneled, going through local networks 1205 and 1228 and core network 1206. None of this bearer traffic needs to be routed through any SIP proxies or TEPs.

It should be noted that temporary IPv4 addresses D1 and D2 may come from separate pools associated, respectively, with TEP 1204 and TEP 1224. Temporary IPv4 addresses D1 and D2 may also come from a single address pool, wherein an association with TEP 1204 or TEP 1224 is generated or eliminated dynamically as necessary.

FIG. 13 shows sample network 1300 connecting DS hosts 1301 and 1302 via IPv4 core network 1309, illustrating the transmission of simplified sample bearer traffic. Network 1300 comprises DS hosts 1301 and 1302, local IPv6 networks 1303 and 1304, TEPs 1305 and 1306, e-proxies 1307 and 1308, and IPv4 core network 1309. DS host 1301, whose IPv6 address is A, is connected to local IPv6 network 1303 and e-proxy 1307. TEP 1305, whose IPv6 address is C1, is connected to local IPv6 network 1303, e-proxy 1307, and IPv4 core network 1309. DS host 1302, whose IPv6 address is B, is connected to local IPv6 network 1304 and e-proxy 1308. TEP 1306, whose IPv6 address is C2, is connected to local IPv6 network 1304, e-proxy 1308, and IPv4 core network 1309.

A call is set up (not shown) between DS host 1301 and DS host 1302 through their respective home e-proxies 1307 and 1308 in a manner similar, for each e-proxy, to the set-up of a call with an IPv4 host via an IPv4 core network, as described above in relation to FIG. 7. However, in the exchange of INVITE and OK messages, each e-proxy determines that the respective peer host is a DS host connected via an IPv4 core network. E-proxy 1307 instructs TEP 1305 to bind IPv6 address A to temporary assigned IPv4 address D1 for DS host 1301, which uses temporary IPv4 address D2 as the destination address for its peer, DS host 1302. E-proxy 1308 instructs TEP 1306 to bind IPv6 address B to temporary assigned IPv4 address D2 for DS host 1302, which uses temporary IPv4 address D1 as the destination address for its peer, DS host 1301. After the call is set up, bearer traffic is tunneled as IPv4-over-IPv6 traffic between each DS host and its respective TEP and is transmitted as ordinary IPv4 bearer traffic between the two TEPs via IPv4 core network 1309.

If DS host 1301 wants to transmit payload 1310(i) to DS host 1302, then DS host 1301 encapsulates payload 1310(i) in (a) IPv4 header 1310(ii), comprising destination IPv4 address D2 and source IPv4 address D1 and (b) IPv6 header 1310(iii), comprising destination IPv6 address C1 and source IPv6 address A. DS host 1301 transmits the resultant packet 1310 to TEP 1305 via local IPv6 network 1303. TEP 1305 extracts the payload and IPv4 header from packet 1310 and transmits corresponding packet 1310' to TEP 1306 via IPv4 core network 1309. Packet 1310' comprises payload 1310'(i) and IPv4 header 1310'(ii), which are substantially identical to payload 1310(i) and IPv4 header 1310(ii). TEP 1306 encapsulates the information in data packet 1310' with IPv6 header 1310"(iii), comprising destination IPv6 address B and source IPv6 address C2, to generate data packet 1310". Data packet 1310" further comprises payload 1310"(i) and IPv4 header 1310"(ii), which are substantially identical to 1310'(i) and 1310'(ii). TEP 1306 transmits data packet 1310" to DS host 1308 via local IPv6 network 1304. DS host 1308 then extracts, from data packet 1310", payload 1310"(i), which is substantially identical to payload 1310(i).

Table III shows possible data transmission setups to be used, and illustrative figures, for different types of core networks, depending on the type of peer host where the first host is a DS host connected to an IPv6 local network.

TABLE III

|  | IPv4-only peer host | IPv6-only peer host | DS-host peer host |
| --- | --- | --- | --- |
| IPv4-only core network | TEP and e-proxy at first host; FIGS. 6, 7, and 8 | Call set-up fails | TEP and e-proxy at both first and peer host; FIG. 13 |

TABLE III-continued

|  | IPv4-only peer host | IPv6-only peer host | DS-host peer host |
|---|---|---|---|
| IPv6-only core network | TEP and e-proxy at peer host; FIGS. 10 and 11 | Native IPv6 communication | Native IPv6 communication |
| IPv4/IPv6 core network | TEP and e-proxy at either first host or peer host; FIG. 12 | Native IPv6 communication | Native IPv6 communication |

It should be noted some hosts in a network may be non-compliant DSTM hosts, wherein the non-compliant DSTM host may be adapted to function as a prior-art DSTM host, but not be adapted to perform all the functions of a DS host. If a non-compliant DSTM host is connected to an IPv4 network, then it may be treated as an IPv4-only host for call set-up and communication purposes, while if a non-compliant DSTM host is connected to an IPv6 network, then it may be treated as an IPv6-only host for call set-up and communication purposes. It should further be noted that some hosts have IPv4 and IPv6 interfaces, but are neither DS hosts nor non-compliant DSTM hosts; if such hosts are connected to an IPv4 network, then they may be treated as IPv4-only hosts for call set-up and communication purposes; if such hosts are connected to an IPv6 network, then they may be treated as IPv6-only hosts for call set-up and communication purposes.

In one embodiment of the invention, an e-proxy is connected to (1) a first network that uses a first network addressing protocol (e.g., IPv6) and (2) a second network different from the first network that uses a second network addressing protocol (e.g., IPv4) different from the first network addressing protocol. The e-proxy is also connected to a tunnel endpoint (TEP) that is adapted to (1) receive data packets from the second network, encapsulate the data packets with a first-network-addressing-protocol-compatible (FNAPC) header, and provide the encapsulated data packets to the first network and (2) receive encapsulated data packets from the first network, decapsulate the encapsulated data packets to extract second-network-addressing-protocol-compatible (SNAPC) data packets, and provide the decapsulated data packets to the second network.

The e-proxy communicates with (1) a first, dual-stack, host that (a) uses the first network addressing protocol and (b) can generate and process encapsulated data packets comprising SNAPC data packets encapsulated with FNAPC headers and (2) a second host that uses the second network addressing protocol. If the e-proxy receives a message indicating that a user at the second host wishes to initiate a peer-to-peer connection with a user at the dual-stack host, or vice versa, then the-proxy assigns a temporary SNAPC address to the dual-stack host and instructs the TEP to bind the temporary SNAPC address to the FNAPC address of the dual-stack host so as to generate a tunnel between the TEP and the dual-stack host using encapsulation and decapsulation of data packets. The e-proxy sends appropriate corresponding messages to the second host and the dual-stack host, modified as appropriate, so that they may commence P2P communication.

The P2P communication bearer traffic does not need to be routed through the e-proxy. The second host sends/receives SNAPC P2P message addressed to/from the temporary SNAPC address. The dual-stack host sends and receives SNAPC P2P messages encapsulated as FNAPC P2P messages, where the SNAPC headers include the temporary SNAPC address and second host address, while the FNAPC headers include the dual-stack host's address and the TEP address.

A particular embodiment of network 600 in FIG. 7 has been described wherein e-proxy 601 sends an UNBIND command to TEP 604 in response to receiving a BYE message to or from DS host 602. In one alternative embodiment of network 600, e-proxy 601 does not necessarily send an UNBIND commands to TEP 604 in response to a BYE message to or from DS host 602. Rather, in addition or alternatively, e-proxy 601 assigns and un-assigns temporary IPv4 addresses to DS host 602 and sends corresponding BIND and UNBIND messages to TEP 604 based on other factors, such as elapsed time and number and types of other calls involving DS host 602. For example, e-proxy 601 might not un-assign an IPv4 address if e-proxy 601 determines that there is a high probability that DS host 602 will soon again need an IPv4 address. As would be appreciated by one of ordinary skill in the art, there are known algorithms available for adaptation for making such probability determinations.

Particular embodiments of the invention have been described wherein components such as hosts and TEPs have addresses represented as alphabetic letters (e.g., A, B, C, C1, C2, D, D1, and D2). As would be appreciated by one of ordinary skill in the art, these letters are mere placeholders and are not actual addresses. For illustration, a sample IPv4 32-bit address is 128.30.248.192, while a sample IPv6 128-bit address is 2001:0 db8:85a3:08d3:1319:8a2e:0370:7344. Similarly, particular embodiments of the invention have been described using port numbers represented as alphabetic letter, such as P and Q. As would be appreciated by one of ordinary skill in the art, these letters are mere placeholders and are not actual port numbers.

Particular embodiments of the invention have been described in relation to an IPv4 or IPv6 core network. It should be noted, however, that no core network is required to be established or exist. As would be appreciated by one of ordinary skill in the art, the invention can be implemented in any network comprising an IPv4 network and an IPv6 network, regardless of which, if either, is considered the core network. In addition, as would be appreciated by one of ordinary skill in the art, the invention can be implemented in any network comprising at least two subsidiary networks, each subsidiary network using a different type of addressing protocol.

It should be noted that embodiments of the invention support user mobility. This support can rely on SIP's built-in support of user mobility. SIP provides a mechanism for maintaining a call if a user changes the IP address corresponding to the user by, for example, changing the user's physical location. This feature may be supported by the use of SIP proxies.

A particular embodiment of the invention has been described as using SIP protocol. It should be noted that the invention is not limited to SIP embodiments, and alternative embodiments use other signaling protocols (SPs) having invite, okay, and bye message types different from the described SIP INVITE, OK, and BYE messages.

A particular embodiment of the invention has been described as setting up a P2P communication session. It should be noted that the invention is not limited to P2P communication sessions, and alternative embodiments set up other types of communication sessions.

It should also be noted that the entities described herein are logical entities. Unless otherwise indicated, two or more logical entities may be implemented as a single process or physical device. Conversely, unless otherwise indicated, a single logical entity may be implemented as multiple processes or physical devices.

Particular embodiments of the invention have been described where an e-proxy is connected between the same subsidiary networks as a corresponding TEP. It should be noted that the e-proxy can be located anywhere in the network where it can communicate with the TEP and the core network.

Particular embodiments of the invention have been described where an e-proxy is the home SIP proxy for a DS host or an IPv4 host establishing a P2P communication session. It should be noted that the e-proxy does not need to be the home proxy for either host. The e-proxy can be connected between respective home proxies of the two hosts through zero or more intermediary SIP proxies. It should also be noted that the communication path between a host and its home proxy may include one or more intermediary SIP proxies.

It should be noted that, in the particular embodiments of the invention described above, the parameters in SIP messages are in SDP-compliant formats. As would be appreciated by one of ordinary skill in the art, alternative embodiments are possible where the parameters are in a different, non-SDP-compliant format.

Particular embodiments of the invention have been described where an e-proxy controls a TEP that encapsulates and decapsulates bearer traffic as appropriate. In alternative embodiments, another IPv4/IPv6 cross-border transport mechanism is used instead of tunneling. In one such alternative embodiment, the e-proxy controls a translation end-point (TrEP) that translates the addresses in headers of bearer traffic to and from IPv4 addresses and IPv6 addresses, as appropriate. Minor changes, as would be appreciated by one of ordinary skill in the art, may be made to the described embodiments of the e-proxy and its operation to function better with a TrEP as the cross-border transport module. For example, there would be no need to provide the DS host with its corresponding IPv4 address since the DS host will simply add an IPv6 header to the payload and will not need to add an IPv4 header. Additionally, with a TrEP, a non-dual-stack IPv6 host could be used instead of a DS host. Also, the e-proxy will have a TrEP control module, rather than a TEP control module, for sending commands to the TrEP to bind and unbind an IPv6 address and an associated IPv4 address.

In one embodiment of the present invention, a host has a plurality of home SIP proxies. Any of the home proxies can be e-proxies. In one implementation, only one of the plurality of home SIP proxies is an e-proxy adapted to provide DSTM services, where if another home SIP proxy determines that DSTM services are needed, the sole e-proxy is instructed to provide the DSTM services. In one implementation, a gateway SIP proxy, which is not a home SIP proxy for the host, is an e-proxy adapted to provide DSTM services to the host upon request by a home SIP proxy.

In one implementation of an e-proxy of the present invention, the e-proxy is distributed over a plurality of servers, wherein (a) one server is a consolidated gateway e-proxy maintaining at least the IPv4 address pool and (b) one or more other servers are local home proxies that receive at least the temporary IPv4 addresses from the gateway e-proxy.

It should be noted that SIP messages can pass through one or more additional SIPs as they traverse a path through a network between a first user's host's home proxy and a second user's host's home proxy. These intermediary SIP proxies may be any suitable types of SIP proxy.

In one alternative embodiment of network 600 of FIG. 7, host 603 is an IPv4 DS host, host 602 may be an IPv6-only host, and bearer traffic packets are (i) tunneled as IPv6-over-IPv4 between IPv4 DS host 603 and TEP 604 and (ii) transmitted as regular IPv6 packets between TEP 604 and IPv6 host 602. Additional minor modifications, such as corresponding modifications to the SIP messages, may be needed, as would be appreciated by one of ordinary skill in the art.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

As used herein in reference to an element and a corresponding standard or protocol, the terms "compatible" and "-format" means that the element conforms, wholly or partially, to the specifications of the standard or protocol, such that the element would be recognized by relevant devices as sufficiently compliant with the standard or protocol.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy, e.g., a signal, is allowed to be transferred between two or more elements, and the interposition of one or more additional elements is contemplated, although not required. The terms "directly coupled," "directly connected," etc., imply that the connected elements are either contiguous or connected via a conductor for the transferred energy.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. A method for processing signaling protocol (SP) messages, the method comprising:
   (1) receiving an SP invite message addressed to one of:
      (i) a first user hosted at a first host connected to a first network using a first network addressing protocol (FNAP), the SP invite message addressed from a second user hosted at a second host connected to a second network, different from the first network, using a second network addressing protocol (SNAP), different from the FNAP; and
      (ii) the second user, the SP invite message addressed from the first user, wherein:
         (a) the first host has an FNAP address;
         (b) the second host has an SNAP address; and
         (c) the SP invite message invites the addressed-to user to set up a communication session with the addressed-from user, the communication session comprising transmission of bearer traffic packets;
   (2) determining that a protocol interworking mechanism for the communication session needs to be invoked;
   (3) if a temporary SNAP address is not already associated with the first host's FNAP address, then:
      (i) obtaining a temporary SNAP address to associate with a cross-border transport module (CBTM), wherein the CBTM has an FNAP address and is adapted to convert bearer traffic packets of the communication session between FNAP-compatible format and SNAP-compatible format; and
      (ii) instructing the CBTM to associate the temporary SNAP address with the first host's FNAP address; and
   (4) forwarding to the addressed-to host a corresponding modified SP invite message that provides at least one of the FNAP address of the CBTM and the temporary SNAP address, wherein:
      the signaling protocol (SP) is Session Initiation Protocol (SIP);
      the FNAP is IPv6;
      the SNAP is IPv4; and
      the communication session is a peer-to-peer (P2P) communication session.

2. The method of claim 1, wherein:
   the receiving step comprises receiving an SP invite message from the first user addressed to the second user; and
   the corresponding modified SP invite message to the second user provides the temporary SNAP address and does not provide the FNAP address of the CBTM.

3. The method of claim 1, wherein:
   the receiving step comprises receiving an SP invite message from the second user addressed to the first user; and
   the corresponding modified SP invite message provides the FNAP address of the CBTM.

4. The method of claim 1, wherein, during the communication session:
   (i) the first host addresses FNAP-format bearer traffic packets of the communication session to the FNAP address of the CBTM;
   (ii) the second host addresses SNAP-format bearer traffic packets of the communication session to the temporary SNAP address; and
   (iii) the CBTM converts:
      (a) FNAP-format bearer traffic packets of the communication session addressed from the first host and addressed to the CBTM into SNAP-format bearer traffic packets addressed to the second host and addressed from the temporary SNAP address; and
      (b) SNAP-format bearer traffic packets of the communication session addressed from the second host and addressed to the temporary SNAP address into FNAP-format bearer traffic addressed to the first host and addressed from the CBTM.

5. The method of claim 4, wherein the CBTM converts bearer traffic packets by tunneling, wherein the CBTM is a Tunnel End-Point (TEP) that, during the communication session:
   encapsulates SNAP-format bearer traffic packets from the second host to generate FNAP-format bearer traffic packets for delivery to the first host; and
   decapsulates FNAP-format bearer traffic packets from the first host to extract SNAP-format bearer traffic packets for delivery to the second host.

6. The method of claim 5, wherein the step of instructing the TEP to associate the temporary SNAP address with the first host's FNAP address comprises sending, to the TEP, a binding message comprising the temporary SNAP address and the first host's FNAP address.

7. The method of claim 5, wherein:
   the receiving step comprises receiving an SP invite message from the second user addressed to the first user; and
   the corresponding modified SP invite message to the first user provides:
      the FNAP address of the CBTM;
      the temporary SNAP address;
      the SNAP address of the second host; and
      an invocation of the protocol interworking mechanism.

8. The method of claim 4, wherein the CBTM is a translation end-point (TrEP) that, during the communication session:
   translates SNAP-format bearer traffic packets from the second host and addressed to the TrEP into FNAP-format bearer traffic packets addressed to the first host; and
   translates FNAP-format bearer traffic packets from the first host and addressed to the TrEP into SNAP-format bearer traffic packets addressed to the second host.

9. The method of claim 1, further comprising:
   (5) receiving a corresponding SP okay message from the addressed-to user; and
   (6) forwarding, to the addressed-from user, a corresponding modified SP okay message that provides at least one of the FNAP address of the CBTM and the temporary SNAP address.

10. The method of claim 9, wherein:
    the CBTM is a tunneling end-point (TEP);
    the SP invite is addressed to the second user;
    the corresponding modified SP invite message to the second user provides the temporary SNAP address;
    the corresponding SP okay message is addressed to the first user; and
    the corresponding modified SP okay message to the first user provides:
       the FNAP address of the CBTM;
       the temporary SNAP address;
       the SNAP address of the second host; and
       an invocation of the protocol interworking mechanism.

11. The method of claim 9, wherein determining that a protocol interworking mechanism for the communication session needs to be invoked:
    is performed after receiving the corresponding SP okay message; and
    depends on the contents of the corresponding SP okay message.

12. The method of claim 1, wherein the corresponding modified SP invite message to the addressed-to user provides the temporary SNAP address in a required SP invite message body section and provides the FNAP address of the CBTM in an optional SP invite message body section.

13. The method of claim 1, wherein:
the SP invite message is a SIP INVITE message; and
instructing the CBTM is performed using a BIND message.

14. The method of claim 1, wherein if a temporary SNAP address is already associated with the first host's FNAP address, then:
(i) obtaining a different temporary SNAP address to associate with the CBTM; and
(ii) instructing the CBTM to associate the different temporary SNAP address with the first host's FNAP address.

15. An enhanced signaling protocol (SP) proxy, the proxy (a) comprising a processor and a memory and (b) adapted to:
(1) receive an SP invite message addressed to one of:
(i) a first user hosted at a first host (connected to a first network using a first network addressing protocol (FNAP), the SP invite message addressed from a second user hosted at a second host connected to a second network, different from the first network, using a second network addressing protocol (SNAP), different from the FNAP; and
(ii) the second user, the SP invite message addressed from the first user, wherein:
(a) the first host has an FNAP address;
(b) the second host has an SNAP address; and
(c) the SP invite message invites the addressed-to user to set up a communication session with the addressed-from user, the communication session comprising transmission of bearer traffic packets;
(2) determine that a protocol interworking mechanism for the communication session needs to be invoked;
(3) if a temporary SNAP address is not already associated with the first host's FNAP address, then:
(i) obtain a temporary SNAP address to associate with a cross-border transport module (CBTM), wherein the CBTM has an FNAP address and is adapted to convert bearer traffic packets of the communication session between FNAP-compatible format and SNAP-compatible format; and
(ii) instruct the CBTM to associate the temporary SNAP address with the first host's FNAP address; and
(4) forward to the addressed-to host a corresponding modified SP invite message that provides at least one of the FNAP address of the CBTM and the temporary SNAP address, wherein:
the signaling protocol (SP) is Session Initiation Protocol (SIP);
the FNAP is IPv6;
the SNAP is IPv4; and
the communication session is a peer-to-peer (P2P) communication session.

16. The enhanced SP proxy of claim 15, wherein the enhanced SP proxy and the CBTM are connected to each other and to the first and second networks.

17. The enhanced SP proxy of claim 15, wherein the enhanced SP proxy is further adapted to:
(5) receive a corresponding SP okay message from the addressed-to user; and
(6) forward, to the addressed-from user, a corresponding modified SP okay message that provides at least one of the FNAP address of the CBTM and the temporary SNAP address.

18. The enhanced SP proxy of claim 15, wherein the CBTM is a Tunnel End-Point (TEP) adapted to:
encapsulate SNAP-format bearer traffic packets from the second host to generate FNAP-format bearer traffic packets for delivery to the first host; and
decapsulate FNAP-format bearer traffic packets from the first host to extract SNAP-format bearer traffic packets for delivery to the second host.

19. The enhanced SP proxy of claim 15, wherein the CBTM is a Translation End-Point (TrEP) adapted to:
translate SNAP-format bearer traffic packets from the second host and addressed to the TrEP into FNAP-format bearer traffic packets addressed to the first host; and
translate FNAP-format bearer traffic packets from the first host and addressed to the TrEP into SNAP-format bearer traffic packets addressed to the second host.

20. The enhanced SP proxy of claim 15, wherein:
the enhanced SP proxy is an e-proxy;
the SP invite message is a SIP INVITE message; and
instructing the CBTM is performed using a BIND message.

21. A first host connected to a first network using a first network addressing protocol (FNAP), the first host (a) comprising a processor and a memory and (b) adapted to:
(1) receive from an e-proxy a modified SP invite message, wherein:
the modified SP invite message is generated by the e-proxy from a corresponding first SP invite message addressed to a first user hosted at the first host;
the first SP invite message is addressed from a second user hosted at a second host connected to a second network, different from the first network;
the second network uses a second network addressing protocol (SNAP), different from the FNAP;
each of the first SP invite message and the corresponding modified SP message has an invitation for the first user to set up a communication session with the second user;
the communication session comprises transmission of bearer traffic packets;
the first host has an FNAP address;
the second host has an SNAP address;
the modified SP invite message provides an FNAP address of a cross-border transport module (CBTM) and a temporary SNAP address associated with the first host's FNAP address; and
the CBTM is adapted to convert bearer traffic packets of the communication session between FNAP-compatible format and SNAP-compatible format;
(2) use a protocol interworking mechanism for the communication session in response to an invocation by the e-proxy, in the modified SP invite message, to use the protocol interworking mechanism; and
(3) use the FNAP address of the CBTM and the temporary SNAP address in generating outgoing bearer traffic packets for the communication session, wherein:
the signaling protocol (SP) is Session Initiation Protocol (SIP);
the FNAP is IPv6;
the SNAP is IPv4; and
the communication session is a peer-to-peer (P2P) communication session.

\* \* \* \* \*